United States Patent
Vande Haar

(10) Patent No.: US 12,472,911 B2
(45) Date of Patent: Nov. 18, 2025

(54) SYSTEMS AND METHODS FOR GROUND DISTANCE CONTROL

(71) Applicant: DEERE & COMPANY, Moline, IL (US)

(72) Inventor: William J. Vande Haar, Janesville, IA (US)

(73) Assignee: Deere & Company, Moline, IL (US)

( * ) Notice: Subject to any disclaimer, the term of this patent is extended or adjusted under 35 U.S.C. 154(b) by 36 days.

(21) Appl. No.: 18/602,789

(22) Filed: Mar. 12, 2024

(65) Prior Publication Data
US 2025/0018906 A1    Jan. 16, 2025

Related U.S. Application Data

(60) Provisional application No. 63/513,105, filed on Jul. 11, 2023.

(51) Int. Cl.
*B60T 7/12* (2006.01)
*B60T 8/17* (2006.01)
(Continued)

(52) U.S. Cl.
CPC .............. *B60T 7/12* (2013.01); *B60T 8/1701* (2013.01); *B60T 8/171* (2013.01); *B60T 8/172* (2013.01);
(Continued)

(58) Field of Classification Search
CPC .......... B60T 7/12; B60T 8/1701; B60T 8/171; B60T 8/172; B60T 8/58; B60T 2201/02;
(Continued)

(56) References Cited

U.S. PATENT DOCUMENTS

| | | |
|---|---|---|
| 5,938,714 A | 8/1999 | Satonaka |
| 6,006,144 A | 12/1999 | Takahashi et al. |

(Continued)

FOREIGN PATENT DOCUMENTS

| | | |
|---|---|---|
| CA | 2791436 A1 | 4/2014 |
| CA | 2959217 A1 | 8/2018 |

(Continued)

OTHER PUBLICATIONS

KB Killbros, 1950 Dual-Auger Grain Cart, 2016, 8 pages.
German Search Report issued in application No. 102024116062.4 dated Feb. 7, 2025, 06 pages.

*Primary Examiner* — Tisha D Lewis
(74) *Attorney, Agent, or Firm* — Taft Stettinius & Hollister LLP; Stephen F. Rost

(57) ABSTRACT

Ground distance control for automated vehicles wherein operation of at least a transmission and/or braking system(s) can be controlled in response to a generated distance request to achieve an identified travel distance, as well as to satisfy a maximum force or thrust command. As the vehicle travels, a measured distance can be tallied such that the measured distance increases when the vehicle travels in a first direction, and decreases when the vehicle travels in a second direction. The system can automatically determine a distance to be traveled, in terms of the measured distance, before commands are to operate a brake actuator and/or transmission actuator to decelerate and/or stop the movement of the vehicle. The system can further evaluate whether the measured distance at the location at which the vehicle actually stopped is within a distance tolerance of the distance request. The measured distance may be reset at key-on or key-off.

20 Claims, 15 Drawing Sheets

(51) Int. Cl.
*B60T 8/171* (2006.01)
*B60T 8/172* (2006.01)
*B60T 8/58* (2006.01)
*B60W 10/10* (2012.01)
*B60W 10/18* (2012.01)

(52) U.S. Cl.
CPC ............ *B60T 8/58* (2013.01); *B60T 2201/02* (2013.01); *B60T 2260/09* (2013.01)

(58) Field of Classification Search
CPC ...... B60T 2260/09; B60T 7/22; B60W 10/10; B60W 10/18
See application file for complete search history.

(56) References Cited

U.S. PATENT DOCUMENTS

| | | | |
|---|---|---|---|
| 7,874,899 B2 | 1/2011 | Mackin et al. |
| 8,032,255 B2 | 10/2011 | Phelan et al. |
| 8,126,620 B2 | 2/2012 | Ringwald et al. |
| 8,380,401 B2 | 2/2013 | Pighi et al. |
| 8,626,406 B2 | 1/2014 | Schleicher et al. |
| 8,662,972 B2 | 3/2014 | Behnke et al. |
| 8,781,692 B2 | 7/2014 | Kormann |
| 8,868,304 B2 | 10/2014 | Bonefas |
| 9,043,096 B2 | 5/2015 | Zielke et al. |
| 9,049,817 B2 | 6/2015 | McCully et al. |
| 9,113,588 B2 | 8/2015 | Kormann |
| 9,119,342 B2 | 9/2015 | Bonefas |
| 9,169,032 B2 | 10/2015 | Gengerke |
| 9,185,845 B2 | 11/2015 | Van Mill et al. |
| 9,187,259 B2 | 11/2015 | Van Mill et al. |
| 9,272,853 B2 | 3/2016 | Van Mill et al. |
| 9,326,444 B2 | 5/2016 | Bonefas |
| 9,374,939 B2 | 6/2016 | Pickett et al. |
| 9,392,746 B2 | 7/2016 | Darr et al. |
| 9,457,971 B2 | 10/2016 | Bonefas et al. |
| 9,499,140 B2 | 11/2016 | Fletcher et al. |
| 9,529,364 B2 | 12/2016 | Foster et al. |
| 9,545,048 B2 | 1/2017 | Pickett et al. |
| 9,596,805 B2 | 3/2017 | Van Mill et al. |
| 9,596,809 B2 | 3/2017 | Van Mill et al. |
| 9,615,509 B2 | 4/2017 | Flickinger et al. |
| 9,642,305 B2 | 5/2017 | Nykamp et al. |
| 9,763,389 B2 | 9/2017 | Bump et al. |
| 9,820,436 B2 | 11/2017 | Inoue et al. |
| 9,861,040 B2 | 1/2018 | Bonefas |
| 9,873,570 B2 | 1/2018 | Van Mill et al. |
| 10,015,928 B2 | 7/2018 | Nykamp et al. |
| 10,019,790 B2 | 7/2018 | Bonefas et al. |
| 10,028,434 B2 | 7/2018 | Van Mill et al. |
| 10,028,441 B2 | 7/2018 | Van Mill et al. |
| 10,028,442 B1 | 7/2018 | Crosby |
| 10,106,333 B2 | 10/2018 | Beaujot et al. |
| 10,278,328 B2 | 5/2019 | Thomson et al. |
| 10,292,327 B2 | 5/2019 | Ducroquet et al. |
| 10,351,364 B2 | 7/2019 | Green et al. |
| 10,406,961 B2 | 9/2019 | Grodecki et al. |
| 10,664,726 B2 | 5/2020 | Wellington et al. |
| 10,760,946 B2 | 9/2020 | Meier et al. |
| 10,765,063 B2 | 9/2020 | Van Mill et al. |
| 10,807,812 B2 | 10/2020 | Thomson et al. |
| 10,830,634 B2 | 11/2020 | Blank et al. |
| 11,008,177 B2 | 5/2021 | Banthia et al. |
| 11,240,961 B2 | 2/2022 | Anderson et al. |
| 11,272,667 B2 | 3/2022 | Bump et al. |
| 11,310,963 B2 | 4/2022 | Burnley et al. |
| 11,457,562 B2 | 10/2022 | Van Mill et al. |
| 11,659,788 B2 | 5/2023 | Puryk et al. |
| 11,825,765 B2 | 11/2023 | Van Mill et al. |
| 11,930,738 B2 | 3/2024 | O'connor et al. |
| 2006/0091728 A1* | 5/2006 | Fulks ................ B60T 7/22 303/193 |
| 2009/0321154 A1 | 12/2009 | Johnson |
| 2011/0220677 A1 | 9/2011 | Bertolani |
| 2012/0099948 A1 | 4/2012 | Bump et al. |
| 2014/0277963 A1 | 9/2014 | Van Mill et al. |
| 2014/0286731 A1 | 9/2014 | Van Mill et al. |
| 2015/0101519 A1 | 4/2015 | Blackwell et al. |
| 2018/0242521 A1 | 8/2018 | Thomson et al. |
| 2018/0244477 A1 | 8/2018 | Stilborn et al. |
| 2019/0196501 A1* | 6/2019 | Lesher ................ G05D 1/0293 |
| 2019/0322461 A1 | 10/2019 | Banthia et al. |
| 2021/0195840 A1 | 7/2021 | Puryk et al. |
| 2021/0294337 A1 | 9/2021 | Van Mill et al. |
| 2021/0333790 A1 | 10/2021 | Kean et al. |
| 2022/0071078 A1 | 3/2022 | Boyer et al. |
| 2022/0197302 A1 | 6/2022 | Mcclelland et al. |
| 2022/0228902 A1 | 7/2022 | Von Muenster |
| 2022/0228906 A1 | 7/2022 | Von Muenster |
| 2022/0348412 A1 | 11/2022 | Cauley |
| 2022/0397442 A1 | 12/2022 | O'Connor et al. |
| 2022/0408641 A1 | 12/2022 | Van Mill et al. |
| 2022/0410704 A1 | 12/2022 | O'Connor et al. |
| 2023/0031013 A1 | 2/2023 | Faust et al. |
| 2023/0093038 A1 | 3/2023 | Schlimgen et al. |
| 2024/0032474 A1 | 2/2024 | Ritter et al. |

FOREIGN PATENT DOCUMENTS

| | | | |
|---|---|---|---|
| CA | 2959257 A1 | 8/2018 | |
| DE | 102018210514 A1 | 12/2018 | |
| DE | 102024107463 A1 | 10/2024 | |
| EP | 0982172 A2 * | 3/2000 | ......... B60K 31/0008 |
| EP | 2245916 B1 | 2/2013 | |
| GB | 1104906 A | 3/1968 | |
| JP | 2023027997 | 3/2023 | |
| WO | 2018102524 A1 | 6/2018 | |
| WO | 2022036114 A1 | 2/2022 | |
| WO | 2023150219 A1 | 8/2023 | |

* cited by examiner

SYSTEMS AND METHODS FOR GROUND DISTANCE CONTROL

CROSS-REFERENCE TO RELATED APPLICATIONS

The present application is a U.S. non-provisional application that claims the benefit of U.S. provisional application No. 63/513,105, filed on Jul. 11, 2023, which is incorporated herein by reference in its entirety.

FIELD OF THE DISCLOSURE

The present disclosure generally relates to automated control of vehicles, and, more specifically, to automated ground distance control for vehicles.

BACKGROUND

Agricultural vehicles can include agricultural and construction machines, vehicles, and equipment, as well as combinations thereof, that are used to perform different agricultural and industrial tasks. For example, one or more agricultural vehicles, including, but not limited to harvesters and windrowers, can be utilized to plant crops, harvest crops, bail or otherwise collect crops, and spray or distribute crop inputs, such as, for example, fertilizer or chemicals, over a field or plants within a field.

Often, an agricultural vehicle can be coupled to an implement that the agricultural vehicle can tow, including either pull or push the implement. For example, agricultural vehicles can be coupled to an implement via a hitch or drawbar, among other manners of coupling. In such situations, the power provided by the agricultural vehicle to propel the agricultural vehicle in either, or both, forward and rearward directions of travel can similarly be used displace the attached, or towed, implement with the agricultural vehicle. Traditionally, the extent to which the agricultural vehicle and the towed implement are to travel has often been controlled via an operator of the agricultural vehicle. Moreover, an operator of the agricultural vehicle can judge, from the operator's position in the agricultural vehicle, the travel location at which the agricultural vehicle, and thus the towed implement, are to stop.

Such judgments by the operator can be prone to create at least certain issues with respect to the operation of the towed implement. For example, with respect to towed implements in the form of grain carts, a misjudgment in terms of the location at which the operator stops the agricultural vehicle can result in product being unloaded from the grain cart at a location at which, while traveling from the grain cart to a storage location, at least some of the unloaded product encounters, and is deflected by, an obstruction. For example, grain product can be unloaded at a location at which the grain product hits a canopy support or loop of a receiving storage trailer. In such situations, at least some of the product can be deflected to a location outside of the storage trailer, thereby contributing to product loss.

Accordingly, there is continued interest in developing ground distance control for automated vehicles and equipment.

SUMMARY

The present disclosure may comprise one or more of the following features and combinations thereof.

In one embodiment of the present disclosure, a system is provided for automatically controlling a distance of ground travel. The system can include a transmission actuator configured to adjust a transfer of power by a transmission system from a prime mover of the system, a brake actuator configured to control an operation of a brake system that adjusts a speed of travel of the system, and at least one processor. A memory device is coupled with the at least one processor, the memory device including instructions that when executed by the at least one processor cause the at least one processor to generate a distance request comprising a desired distance the system is to travel to reach a target location, determine a distance tolerance, and monitor, as the system travels, a measured distance. The measured distance can correspond to a distance of measured travel by the system. The memory device can also include instructions that when executed by the at least one processor cause the at least one processor to generate, automatically, one or more signals to adjust an operation of the brake actuator and the transmission actuator to facilitate a stop in a travel of the system at a target location at which a difference between the measured distance and the distance request satisfies the distance tolerance.

In another embodiment, a method is provided for automatically controlling a distance of ground travel by a system. The method can include determining a distance request corresponding to a desired distance the system is to travel from an initial position to a target location, determining a distance tolerance for the distance request, and measuring, as the system travels, a measured distance traveled by the system. The method can also include comparing, as the system travels, the measured distance with the distance request, and generating, in response to an outcome of comparing the measured distance with the distance request, one or more commands for a brake actuator and a transmission actuator of the system. Additionally, the method can include determining the measured distance at which, before satisfying the distance request, a speed of travel of the system is to begin a deceleration. In response to a difference between the measured distance and the distance request satisfying the distance tolerance, a command can be generated for at least one of the brake actuator and the transmission actuator that facilitates a stop in the travel of the system.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
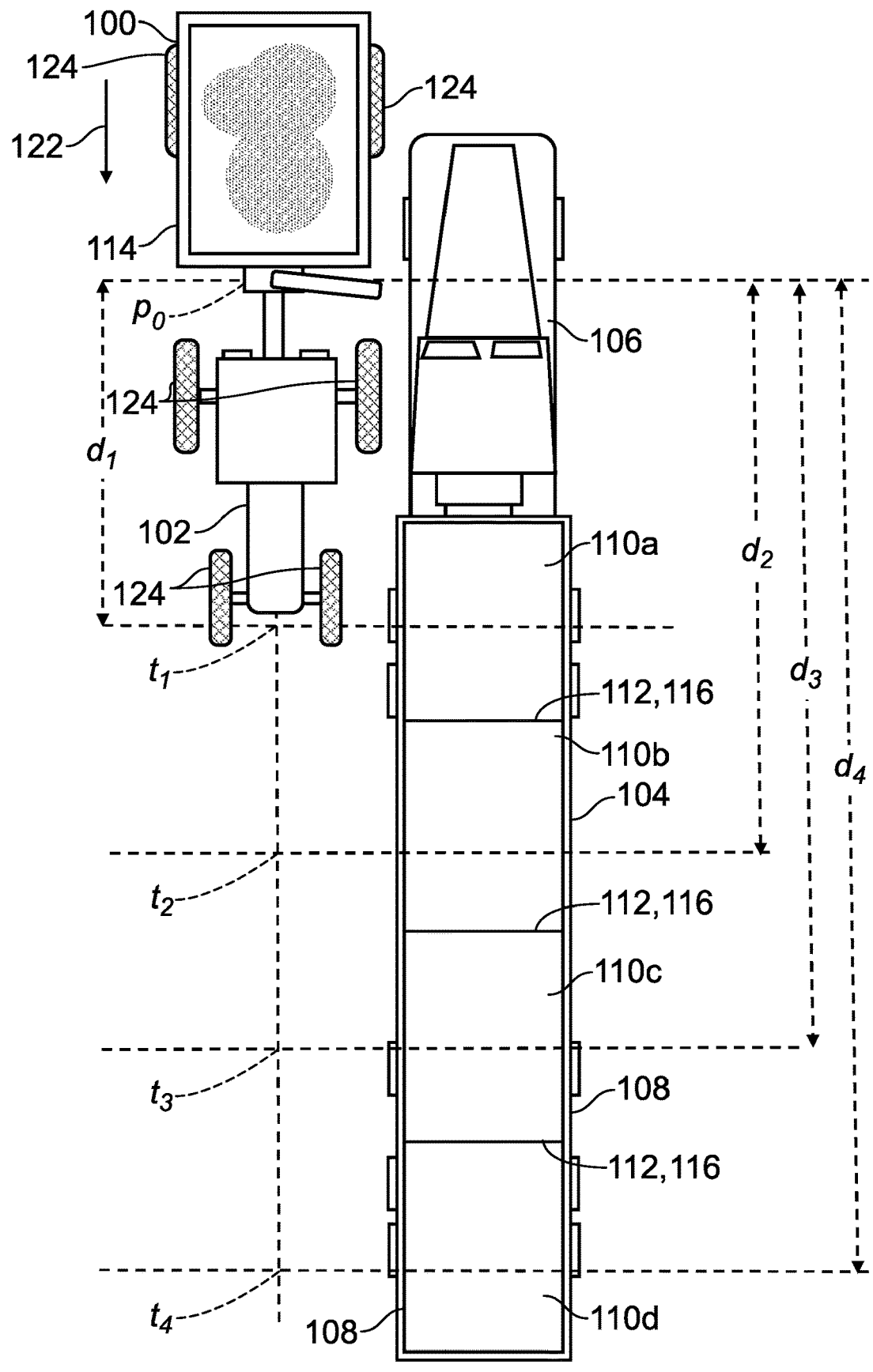
FIG. 1 illustrates a top plan view of an exemplary vehicle and towed implement in the form of an agricultural vehicle and a grain cart, respectively, at an initial location for performing an exemplary agricultural operation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

According to certain embodiments, a vehicle can track a distance the vehicle has traveled and report a value corresponding to the distance traveled on a communication network, such as, for example, a controller area network (CAN), internet, Ethernet, cellular, and/or Wi-Fi networks. This distance traveled value can increase for forward motion, and decrease for rearward motion. The vehicle can also be configured to stop wheel motion of the vehicle using the brakes, the transmission, or a combination of the brakes and transmission of the vehicle without operator engagement, including, for example, without the operator engaging or activating the brakes or adjusting a transmission shift lever. The vehicle can also be configured to initiate motion or movement of the vehicle without operator input. Furthermore, the vehicle can take, ore receive, instructions from an automation controller that is on the implement or an automation controller that is part of the vehicle.

The distance the vehicle travels can be measured in a variety of different ways. For example, according to certain embodiments, the distance traveled by the vehicle can be measured by accumulating wheel speed pulse counts from a drive train of the vehicle. According to such an embodiment, the wheel speed pulse count can be converted to a distance measurement, such as, for example, via use of an axle ratio and a rolling radius of the vehicle. Additionally, or alternatively, the distance traveled may be calculated, or measured, by turns of an electric motor of the vehicle, including, for example, an electric motor utilized for the prime mover of the vehicle. Additionally, or alternatively, the distance traveled may be determined, including measured, using information from a location system, such as, for example, a Global Positioning System (GPS) or a radar system, among others. Further, according to certain embodiments, the distance traveled may be determined, including measured, using information, including videos, pictures, and/or still images, captured by an optical sensor, such as, for example, from fiducial markers detected in information captured by a camera(s), including, but not limited to, stereo camera disparity. However, a variety of other types of technology can be used to determine, including measure, distances traveled, including, for example, lidar and sonar based systems or sensors. Further, according to certain embodiments, the distance traveled can be represented by a value that starts at zero at key-on or activation of the vehicle, or based on a key cycle, and tallies the distance traveled since key-on, with the tallied distance being cleared or reset to zero in response to the subsequent key-off, or deactivation, of the vehicle, and/or in response to another key-on of the vehicle. Additionally, or alternatively, for convenience, an outside controller can request that the value for distance traveled be reset to zero either in response to either, or both, key-off or key-on of the vehicle. However, according to other embodiments, the distance traveled can be represented by a non-zero value, including a non-zero value that is present at key-on or activation of the vehicle. Further, according to certain embodiments, an operator may be presented with the option of starting measuring distance from either a zero or non-zero value, and thus may, or may not reset such a value at key-on.

While a vehicle can be controlled to a speed and acceleration of travel of the vehicle, according to embodiments discussed herein, the vehicle can alternatively, or additionally, be automatically controlled based on a distance traveled, or to be traveled. Further, according to certain embodiments, an automation controller or a drive strategy controller can communicate a distance request to the vehicle, or systems, components, or devices of the vehicle, and the vehicle that can comprise a desired distance that the vehicle is to travel. Further, using information from the distance request, the vehicle can be operated to maintain a desired speed and deceleration so that the vehicle stops at the desired distance. If the automation controller, or other controller, adjusts the distance request, such as, for example, increases the desired distance, the vehicle can be accelerated to a predetermined speed and then again decelerate and stop at the new desired distance. According to certain embodiments, the distance request can be generated by operator input, including, for example, via scrolling an encoder or touch screen display input of an input/output device. Additionally, or alternatively, the distance request can also be generated by the automation controller, or other controller. Further, the distance request can be premised on the vehicle traveling a distance such that the travel of the vehicle, or associated implement, starts and stops as a function of an automation task, such as, for example, an automation task relating to a performance of one or more agricultural operations. Furthermore, the distance request can come from an implement that is attached to the vehicle.

In connection with the distance request, a distance request tolerance can also be generated. According to certain embodiments, the distance request tolerance can be a tolerance in terms of a variation or difference between the desired distance of the distance request, and the actual, measured distance traveled (which is also referred to herein as the measured distance) by the vehicle and/or implement travel in attempting to attain the desired distance. The distance request tolerance can be communicated to one or more controllers associated with systems or subsystems of the vehicle and/or implement, including, for example, one or more controllers associated with a brake system and/or transmission system of the vehicle and/or implement. The controller(s) can evaluate the distance request tolerance and determine whether that associated system, which, in this example, is either or both an associated brake system and/or transmission system, can achieve the distance request tolerance. If the controller(s) determines the associated system(s) can operate in a manner that can satisfy the distance request tolerance, then controller(s) can respond, such as to the requesting controller(s), with a distance tolerance that matches the distance request tolerance. However, if one or more the controller(s) associated with one or more of the systems receiving the distance request tolerance determines the associated system(s) cannot satisfy the distance request tolerance, than that/those controller(s) can respond to the distance request tolerance with a distance tolerance that is indicative of the tolerance that/those system(s) can achieve.

In the event the vehicle is unable to stop precisely at the location corresponding to the desired distance of the distance request, the vehicle can report, or determine, a distance tolerance for the desired distance. For example, precisely controlling the distance traveled so as to attain the desired distance of the distance request, or stopping precisely at a target location that corresponds to the vehicle actually traveling a distance associated with the desired request, can be more challenging for certain types of vehicles, including for example, vehicles that have power shift transmissions rather than continuously variable transmissions. The range of the distance tolerance, which can be predetermined, can therefore be utilized to control the accuracy or precision of the distance the vehicle and/or associated implement actually travels relative to the distance request, and/or the precision with respect to the distance between the vehicle and a target location that corresponds to, or is used in connection with determining, the desired request. Such control of the distance tolerance can thereby result in the vehicle being more accurate in terms of either, or both, the actual distance traveled or stopping within desired distance of the distance request from the target location. The automation controller, among other controllers, can, according to certain embodiments, communicate the desired distance tolerance to a drive strategy controller, which can use such information in connection with the control of at least the transmission system and/or brake system. This desired distance tolerance might also impact how the vehicle behaves as it closes in on the reaching the desired distance of the distance request, including with respect to the declaration of the vehicle, such as, for example, the timing declaration is to occur, the rate of deceleration, and/or the distance to be traveled during deceleration.

According to illustrated embodiments, the transmission system and/or brake system can accept the distance request, as well as receive and accept other related parameters that can be associated with operating the vehicle and/or implement to achieve traveling the desired distance of the distance request. Such related desired parameters can include, for example, one or more of a desired speed, desired maximum speed, maximum desired acceleration, maximum desired deceleration, desired gear, and/or desired maximum jerk. Thus, the vehicle, including an associated controller(s) can control the transmission system and/or brake system to achieve the distance request along with the other desired parameters. According to certain embodiments, the distance request can be relative, such as, for example, a request indicating the vehicle is to travel a desired distance, in meters or other units of measurement, in a first or second direction of travel, such as, for example, a forward or a rearward direction of travel. Additionally, or alternatively, the distance request can be absolute. For example, the distance request can indicate the vehicle is to stop when the measured distance indicates the vehicle has attained the desired distance of the distance request. As discussed herein, the measured distance can be determined in a variety of manners, including, for example, by a ground speed sensor, an overall tallied travel distance, among other manners of measurement, as tracked since the vehicle has been keyed-on (activated), regardless of whether the tally information was, or was not, reset to zero.

The transmission system and/or the brake system can also accept a maximum force or thrust command, which may be in addition to a distance, speed/gear, and/or acceleration request(s). The vehicle can therefore control the transmission system and/or brake system to achieve the desired maximum force or thrust command. According to certain embodiments, the desired maximum force or thrust command can correspond to the maximum force the vehicle, or associated coupling, including hitch, can exert on, or against, an implement that can be towed by the vehicle. For example, according to certain embodiments, the maximum force or thrust command can relate to the force the vehicle, or associated portion of the hitch coupled to the vehicle, can exert against the implement or associated portion of the hitch that is coupled to the implement. Additionally, or alternatively, the maximum force or thrust command can correspond to the force being exerted via operation of the vehicle on the associated hitch or implement while the vehicle is towing the implement. The maximum force or thrust command can be expressed in a variety of manners, including, for example, in engineering units of force such as, for example, pounds, newton, or kilograms of force, among other units of measurement. Thus, features relating to the maximum force or thrust command can be utilized in connection with various tasks and operations. For example, the maximum force or thrust command can be utilized in connection with operations including, but not limited to, attaching to an implement to a vehicle, as well as operations that may, or may not, be performed using an implement, such as, for example scooping soil, among other tasks. According to certain embodiments, the maximum force or thrust command can be received from one or more controllers of the vehicle and/or implement, including, but not limited to, an automation controller. Further, the maximum force or thrust command can be utilized by one or more systems of the vehicle and/or implement in connection with controlling the movement of the vehicle and/or implement. For example, the transmission system can use information from the maximum force or thrust command to calculate a maximum value for a force that the transmission system is to apply in a trans-axle, including, for example, in terms of a maximum pressure in a clutch or via control of a maximum current in a motor.

FIG. 1 illustrates a top plan view of an exemplary implement 100 being towed by a vehicle 102 in the form of an agricultural vehicle that is configured to perform one or more types of agricultural operations. More specifically, in the example provided by FIG. 1, a vehicle 102 in the form of an agricultural vehicle, such as, for example, a tractor, is pulling an implement 100 in the form of a grain cart. While the examples of the vehicle 102 and implement 100 discussed herein and shown in at least FIG. 1 are in the forms of a tractor and grain cart, a variety of other types vehicles and implements can be utilized with the systems and methods disclosed herein. Additionally, while the implement 100 is shown in at least FIG. 1 as being pulled when towed, according to the other embodiments, such towing can involve the vehicle 102 pushing the implement 100.

In the example shown in FIG. 1, the vehicle 102 is configured to unload grain into a grain trailer 104 that is coupled to a semi-truck 106. The trailer 104 can include a plurality of sidewalls 108 that can at least partially define one or more storage compartments 110a-d within the trailer 104, among storage compartments of other equipment, such as, for example, gravity wagons and mother-bins, among other equipment or structures. The trailer 104 can also include one or more partition walls 112 that extend between opposing sidewalls 108, and which, in combination with the sidewalls 108, can also at least partially define the storage compartments 110a-d of the trailer 104. The sidewalls 108 can also at least partially define an opened upper area of the trailer 104 that can accommodate passage of harvested material 114 that is being unloaded from the implement 100 and into a storage compartment(s) 110a-d. Additionally, one or more canopy supports or loops 116 can vertically extend over at least a portion of the partition walls 112 that are configured to provide at least a portion of a tarp or other cover that can at least vertically extend over at least a portion of one or more storage compartments 110a-d. Further, while FIG. 1 illustrates the vehicle 102 and implement 100 in relatively close proximity to the grain trailer 104, in certain situations the vehicle 102 and implement 100 may be a considerable distance from the grain trailer 104. Additionally, in certain instances, either, or both, of the implement 100 and the grain trailer 104 may be moving, such as, for example, via movement of the associated vehicle 102 or semi-truck 106 while harvested material 114 is being unloaded from the implement 100 and into the grain trailer 104.

In instances in which a grain cart is positioned to unload grain at a location at least partially above such canopy supports or loops 116, grain that has been unloaded from the grain cart can, while moving toward the trailer 104, strike or contact a canopy support or loop 116 in a manner that can deflect the grain away from the trailer 104 or a storage compartment 110a-d. As a consequence, at least some grain deflected away from the trailer 104 can land on a ground surface that is outside of the trailer 104, thereby contributing to a potential loss of the product and associated revenue.

In the illustrated embodiment, the implement 100 is coupled to a vehicle 102, such as, for example, a tractor, via a hitch 118, which can be attached to a frame of the implement 100. In such an embodiment, the vehicle 102 can have a propulsion system that can include a prime mover 120 (FIG. 4), such as, for example, an internal combustion, electric, or hybrid engine or motor that can provide a force to propel the vehicle 102 in at least a forward direction 122 of travel, as well as in a direction that is reverse or opposite to the forward direction 122 of travel.

As shown, in the illustrated embodiment, the vehicle 102 has an operator cab 124 and a plurality of engagement bodies 124, such as, for example, wheels or tracks, that can travel along the ground surface 128 of the field. The operator cab can be sized for placement of the operator as the operator operates the vehicle 102. Alternatively, according to certain embodiments, the vehicle 102 can be an autonomous vehicle 102, including an unmanned vehicle. Further, according to other embodiments, rather than being coupled to a vehicle 102, or other agricultural vehicle, the implement 100 can be an autonomous, or self-propelled, vehicle 102.

In the illustrated example in which the towed implement 100 is a grain cart, the implement 100 can include a plurality of sidewalls 126 that can, at least in part, generally define an inner area 128 of the implement 100 that can house harvested material 114. While the inner area 128 is shown in FIG. 1 as being uncovered, according to certain embodiments, the implement 100 can also include a cover or roof that can extend over at least a portion of the inner area 128. The implement 100 can also include a plurality of engagement bodies 130, such as, for example, wheels or tracks, that are positioned to roll along the ground surface. The implement 100 can also include a selectively displaceable conveyance assembly 132 that can be used in the conveyance or unloading of harvested material 114 from the implement 100 and to the trailer 104. While the particular implement 100 illustrated herein is configured to assist in the unloading of grain, other implements 100 configured for other agricultural operations that can be utilized as the towed implement 100, including implements having configurations that may, or may not, be similar to that shown in FIG. 1.

Figure 4:
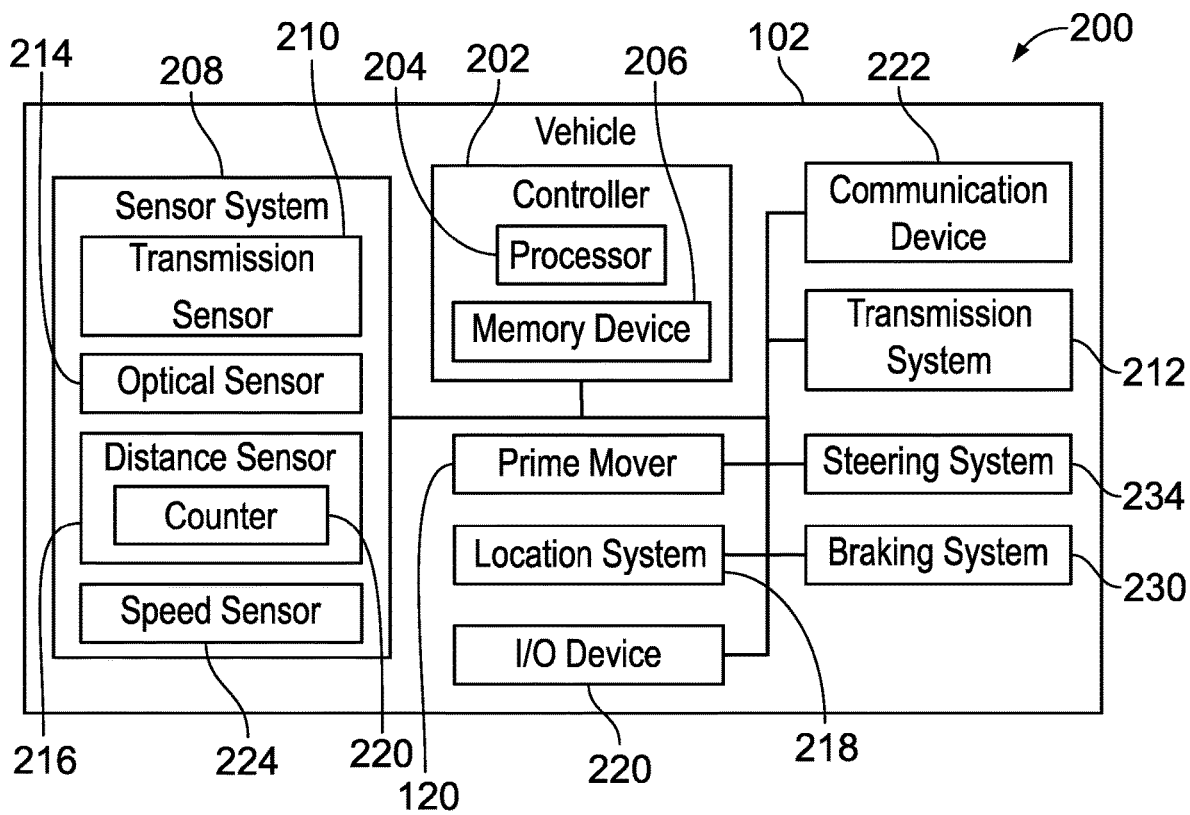
FIG. 4 illustrates a block diagram of an exemplary automated distance control system.
Figure 4:
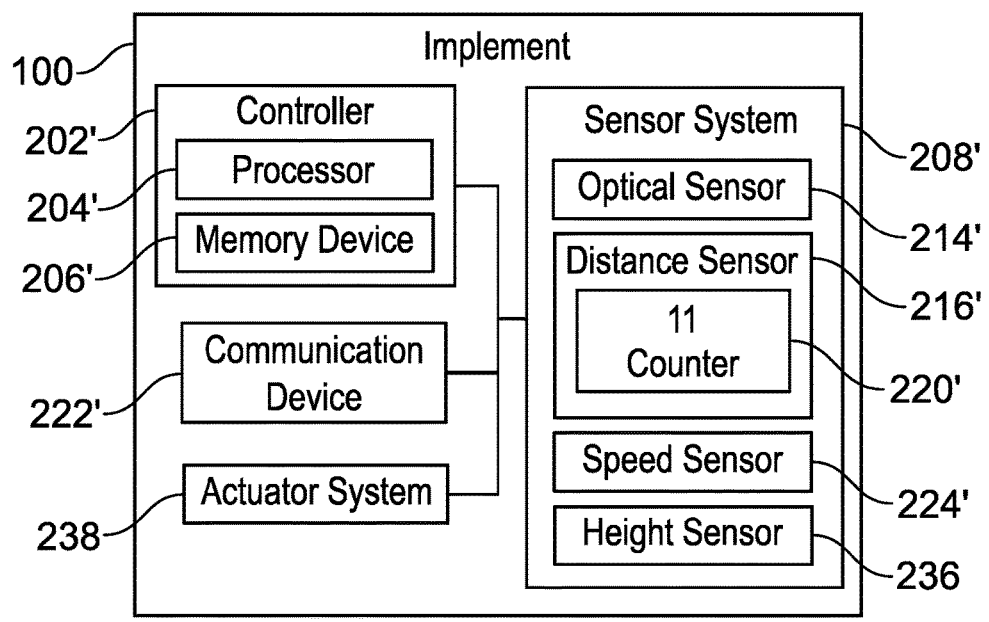

FIG. 4 illustrates a block diagram of an exemplary automated distance control system 200. Either or both of the vehicle 102 and the towed implement 100 can include one or more controllers or control units 202, 202' having one or more processors 204, 204' that can follow instructions, including control instructions, contained on one or more memory devices 206, 206', including, for example, a non-transitory machine-readable medium. For at least purposes of discussion and simplification of illustration, FIG. 4 illustrates both the vehicle 102 and the towed implement 100 as having a single controller 202, 202' coupled to various systems, components, or devices. However, one or more of the various systems, components, or devices of the vehicle 102 and the towed implement 100 shown in FIG. 4, as well as others that are not shown in FIG. 4, can have one or more controllers in addition to, or in lieu of, the controllers 202, 202' shown in FIG. 4. Such additional, or alternative, controllers may, or may not, be dedicated to, or shared by, the systems, components, or devices of the vehicle 102 or implement, and may, or may not, have a configuration similar to the illustrated controllers 202, 202'.

The controller 202 of the vehicle 102, including the processor 204, can execute instructions contained in the memory device 206, as well as in connection with inputted information, to automatically adjust at least the operational settings, position, travel, and/or orientation of the vehicle 102 at least in connection with controlling the distance(s) at which the at least the vehicle 102 travels. The controller 202, including the processor 204, can utilize a variety of different types of inputted information in connection with making determinations and adjustments in the distance to which the vehicle 102, and thus the implement 100, travels, such as, for example, the distance of travel so as to reach one or more target locations, the speed of travel, acceleration and deceleration during travel, or stopping positions, as well as combinations thereof, among other determinations. A variety of different sources can provide such inputted information for the controller 202 in making such determinations, including estimations, such as for, example, information from one or more sensors, look-up tables, databases, or manually inputted information, as well as combinations thereof, among other information.

The vehicle 102 can therefore have a variety of different sensors, which are generally identified in FIG. 4 as being part of a sensor system 208. While illustrated as belonging to the illustrated sensor system 208, the sensors discussed and described herein, among other sensors, can be part of, or shared by, other systems, components, or devices of the vehicle 102. For example, in the embodiment illustrated in FIG. 4, the sensor system 208 is shown as having a transmission sensor 210. However, the illustrated transmission sensor 210 can be part of, including dedicated to, other systems of the vehicle 102, including, for example, be part of the illustrated transmission system 212. The transmission sensor 210 can, for example, be a transmission position sensor or transmission range sensor that can provide information indicating, or used by the controller 202 to determine, the currently engaged gear of a transmission of the transmission system 212 that is being utilized in the transmission of a force or power generated or provided by the prime mover 120 for driving movement of the engagement bodies 124. Additionally, information provided by the transmission sensor 210 can be utilized to detect if the vehicle 102 and/or towed implement 100 are traveling in a forward or rearward direction of travel.

The sensor system 208 can also include one or more optical sensors 214, including, but not limited to, image sensors, cameras, or radar, among types of optical sensors. According to certain embodiments, the optical sensors 214 can be part of, or used in conjunction with, a guidance or steering system 234, among other systems, of the vehicle 102. Additionally, or alternatively, the optical sensor 214 can comprise one or more optical sensors 214 utilized in the movement or operation of the towed implement 100. According to certain embodiments, the optical sensors 214, including, for example, one or more cameras, such as, but not limited to, stereo cameras, can capture information that can include videos, pictures, and/or still images. According to such embodiments, the captured information can be analyzed in connection with determining the measured distance, and, moreover, the distance the vehicle 102 and/or implement 100 has traveled. Further, according to the illustrated embodiment in which the towed implement 100 is a grain cart, the optical sensor 214 can include a camera that can be used to detect a location or position, including position of the grain cart relative to other structures, features, or identifiers around or in the viewing vicinity of the optical sensor. For example, according to certain embodiments, the optical sensor 214 can include a camera of the grain cart that can indicate the location of canopy supports or loops 116 of the grain trailer 104. Additionally, or alternatively, the optical sensor 214 can be at least used in connection with an agricultural operation being performed by the towed implement 100, including obtaining images of grain being, or that has been, unloaded from the grain cart and into a storage compartment 110a-d of the grain trailer 104.

The controller 202, including the processor 204, can evaluate information captured by the optical sensor, including images, pictures, or video, among others, in a variety of manners. For example, according to certain embodiments in which the optical sensor(s) 214 is/are an optical camera, the controller 202 can evaluate captured information on a pixel level, or based on a collection or area(s) of pixels, among other bases for evaluation. Such an evaluation can be based, for example, at least in part on either or both a color and level of light present, or not present, in an area(s) or pixels in the captured information.

The sensor system 208 can further include one or more distance sensors 216 that can detect, or provide information for the controller 202, including the processor 204, to determine, the measured distance, and moreover the distance the vehicle 102 travels. The distance sensor 216 can be used to attain the measured distance in a variety of different manners, as well as a combination of manners. Further, regardless of the manner in which information is collected by the distance sensor(s) 216 for, or used in, determining the measured distance, the measured distance can be in a form, whether based on a unit of measurement or unitless, that can be evaluated to determine whether the desired distance of the distance request has, or has not been satisfied. Further, according to certain embodiments, the measured distance attained from at least information obtained using the distance sensor 216 can be in a form that allows a determination as to whether the measured distance is, or is not, at least within the distance tolerance of the desired distance of the distance request. For example, according to certain embodiments, the distance sensor 216 can be configured to accumulate wheel speed pulse counts in a drivetrain of the vehicle 102. According to such an embodiment, such a wheel speed pulse count can be converted, for example, by the controller 202, to provide a value corresponding to the measured distance via use of an axel ratio and a rolling radius, including, for example, for a wheel engagement body 124, of the vehicle 102. Additionally, or alternatively, the distance sensor 216 can be used to determine the number or speed of turns of an electric motor, including, for example, an electric motor that is utilized as, or with, the prime mover 120, which, again can be used to provide a value representative of the measured distance for evaluation in determining if the distance request and/or associated distance tolerance is, or is not, satisfied. According to other embodiments, the measured distance can be determined using information provided by a location system 218, including, for example via use of location coordinates, including GPS coordinate information, lidar, or radar information provided by the location system 218. Further, according to certain embodiments, the distance sensor 216 can include one or more of the optical sensors 214, and can be configured to calculate distances traveled using capturing information of the area around the vehicle 102. However, the distance sensors 216 can be configured to obtain a variety of other types of information that can be used to provide, or to determine, the measured distance, including, for example, gear tooth counting, or via use of an encoder, among others.

According to certain embodiments, the distance sensor 216 can include, or can be used in conjunction with, a counter 220 that can provide an exemplary manner of expressing and/or tallying the measured distance. Moreover, the counter 220 can provide one exemplary, and non-limiting, manner of tracking, tallying, and/or representing the measured distance(s) the vehicle 102/implement 100 has/have traveled, regardless of the manner in which the distance traveled by the vehicle 102/implement 100 is measured, including regardless of the type or technology used by the distance sensor 216. For example, the counter 220 can provide a count value, which can be referred to as a measured distance count value, that is represent the measured distance that the vehicle 102/implement 100 has traveled. Thus, as the vehicle 102/implement 100 travels, the counter 220 can increment or decrease the measured distance count value. For example, the vehicle 102/implement 100 travels in a first direction (e.g., forward direction), that measured travel can be identified by the counter 220 increasing the measured distance count value. Conversely, as the vehicle 102/implement 100 travels in a second direction (e.g., reverse direction), that measured travel can be identified by the counter 220 decreasing the measured distance count value.

Additionally, according to certain embodiments, the controller 202 and/or counter 220 can also be configured determine, including estimate or predict, the desired distance of distance request in terms of a count value that will be attained when the desired distance is achieve. Such a count value that is to correspond to the distance request can be referred to herein as a desired distance count value. Similarly, a count value(s) associated with the distance tolerance can be referred to as a desired tolerance count value. Thus, according to such embodiments, when the measured count value, as incremented or decreased by the counter 220, reaches the desired distance count value, a determination can be made that the vehicle 102/implement 100 has traveled the desired distance. Similarly, when the measured count value, as incremented or decreased by the counter 220, reaches the distance tolerance count value, a determination can be made that the vehicle 102/implement 100 is traveled a distance that is within the distance tolerance of the desired request.

The controller 202 can be configured to reset, such as, for example, return to a zero value, the measured distance upon either, or both, a key-on, or activation, or a key-off, or deactivation, of the vehicle 102. Additionally, or alternatively, upon the operator turning off, or deactivating, the vehicle 102, such as, for example, turning the vehicle 102 off, the controller 202 can be configured to reset the measured distance to zero. For convenience, according to certain embodiments, a controller that is not part of, or is outside of, the vehicle 102 can be configured to communicate a signal that is received by a communications device 222 that requests that the measured distance be reset to zero. The timing for such a communication can be based on a variety of different criteria, including, for example, the outside controller receiving notification of activation/key-on of the vehicle 102 or an indication that the vehicle 102 has been activated to perform an agricultural operation, among other criteria. Additionally, measured distance can be communicated, or reported, to the outside controller by use of at least the communications device 222.

According to such embodiments, the controller 202 can separately tally measured distances during each individual period of operation of the vehicle 102, and not provide a cumulative measured distance that accounts, collectively, for different periods of operation involving multiple times of the vehicle 102 being activated (keyed-on) and/or deactivated (keyed-off). Such increases and decreases of the measured distance for distinct individual instances of activation and operation of the vehicle 102 can at least assist in determining an overall distance the vehicle 102 has traveled from at least an initial position, which can correspond to the location of the vehicle 102 at the time of activation/key-on.

The location system 218 can be operated to provide a detailed indication of the location of the vehicle 102. According to certain embodiments, the location system 218 can comprise a global positioning system (GPS) or a radar system, among other location systems 218. According to certain embodiments, the location system 218 can include a receiver that can receive information from an external source that can indicate, or be used to determine, the particular location of the vehicle 102, including, for example, via location coordinates.

The communications device 222 of the vehicle 102 can communicate information to, as well as receive information from, other components of the system 200, including, but not limited to, to/from the implement 100, among other vehicles, devices, and databases. The communications device 222 can be embodied as hardware, firmware, software, virtualized hardware, emulated architecture, and/or a combination thereof. According to certain embodiments, the communications device 222 can comprise a transceiver. The communications device 222 can, according to certain embodiments, exchange communications in a variety of manners, such as, for example, via a network, including, for example, via controller 202 area network (CAN), internet, cellular, and/or Wi-Fi networks, as well as via Bluetooth, among other manners or communication or use of other communication protocols.

The sensor system 208 can also include a speed sensor 224 that can be configured to detect, or provide information used to determine, a speed or rate of travel at which the vehicle 102 or an engagement body(ies) 124 is/are currently traveling. Additionally, or alternatively, the speed sensor 224 can provide information indicating, or used to determine, a rate of either, or both, acceleration or deceleration of the vehicle 102 or an engagement body(ies) 124.

The controller 202 can also be coupled to one or more input/output (I/O) devices 226 of the vehicle 102. The I/O devices 226 can take a variety of forms, including, for example, be or include a monitor, screen, touch screen, keyboard, keypad, mouse, switch, joystick, or button, as well as any combinations thereof, among other types of I/O devices 226. According to certain embodiments, the I/O device 226 can be positioned in the operator cab of the vehicle 102. Additionally, or alternatively, the I/O device 226 can be part of a mobile or handheld device or another device that can be remotely located from the vehicle 102.

The transmission system 212 can be configured to transmit power generated by the prime mover 120 to one or more of the engagement bodies 124. A variety of different types of transmission systems 212 can be utilized, including, for example, continuously variable transmissions (CVT), infinitely variable transmissions (IVT), and power shift transmissions (PST), among others. The transmission system 212 can further include a clutch, such as, for example, a traction clutch or a shift clutch for shifting between gear ranges. The controller 202, including one or more controllers that may be dedicated to the transmission system 212, can be utilized to control a position of a transmission actuator 228, such as, for example, a valve or solenoid, among other forms of actuators or controls (collectively referred to herein as "traction clutch valve"). The traction clutch valve can be controlled a signal or current generated by the controller 202 so as to hydraulically control the clutch, and, moreover, the shifting the clutch between gears/gear ranges.

A brake system 230 of the vehicle 102 can comprise an electro-hydraulic brake system, an electrical brake system, or an electrically operated mechanical brake system. According to such embodiments, the controller 202, including one or more controllers of the brake system 230, can generate one or more signals to control the operation, including position, of a hydraulic valve, solenoid, or other electro-mechanical device (collectively referred to herein as "brake actuator" 232) that is used to control the application of a brake that is configured to slow and/or stop the movement of the vehicle 102. For example, in response to a signal or current from the controller 202, the brake actuator 232 can be used to control the position of one or more brake pads relative to a rotor, or brake shoes relative to a drum, so as to generate friction that can either reduce the speed, decelerate, and/or stop a movement or travel of the vehicle 102.

The steering system 234 can comprise either, or both, a front steering system or a rear steering system of the vehicle 102. The controller 202, including one or more controllers dedicated to the steering system 234, can provide signals to operate one or more electric motors and/or actuators (collectively referred to herein as a "steering actuator") that are coupled to, and control the turning and/or position of front and/or rear engagement bodies 124, or the associated front or rear axle of the vehicle 102. For example, according to certain embodiments, the controller 202 can control the position of the steering actuator in a manner that can control a pressure or flow of steering fluid that can be utilized by the steering system 234 in maintaining and/or adjusting an angular position or orientation of one or more engagement bodies 124, front axle(s), and/or rear axle(s) of the vehicle 102.

According to the illustrated embodiment, the towed implement 100 can include a controller 202' having a processor 204' and memory device 206' that is similar to the controller 202, processor 204, and memory device 206 discussed above with respect to the vehicle 102. Moreover, similar to the vehicle 102, the controller 202' of the implement 100 can comprise a plurality of controllers which may be dedicated to, or shared by, various systems, components, and devices of the implement 100. Additionally, the implement 100 can also include a communications device 222' that is similar to the communications device 222 discussed above with respect to the vehicle 102.

The implement 100 can also include a sensor system 208' that is similar to the sensor system 208 discussed above with respect to the vehicle 102. For example, according to the illustrated embodiment, the sensor system 208' can include an optical sensor 214', a distance sensor 216', a counter 220', and a speed sensor 224' that can be similar to the sensors 214, 216, 220, 224 discussed above with respect to the sensor system 208 of the vehicle 102. Additionally, the sensor system 208' of the implement 100 can include one or more additional sensors that may correspond to the type of agricultural operation that is to be performed using the implement 100. For example, according to embodiments in which the implement 100 is a grain cart, the sensor system 208' can include a height sensor 236 that can detect, or provide information used to determine, a height of grain deposited in one or more storage compartments 110a-d of the trailer 104. Thus, while FIG. 4 illustrates the sensor system 208' as including a height sensor 236, the sensor system(s) of other types or configurations of implements 100 may or may not include the height sensor 236, and may include additional or different sensors.

The implement 100 can also include an actuator system 238 that can be utilized by the implement 100 to perform an associated agricultural operation. For example, with respect to embodiments in which the implement 100 is a grain cart, the actuator system 238 can include a gate actuator that can be utilized to control the flow of grain from the inner area 128 of the implement 100 to an auger or conveyor belt of the conveyance assembly 132. The actuator system 238 can also include a conveyance auger of the conveyance assembly 132 that can be utilized to drive the rotational displacement of the auger, among other conveyance means used to displace the grain to a location at which the grain can be unloaded from a chute of the grain cart, and thus unloaded into a storage compartment 110a-d of the grain trailer 104.

Figure 5:
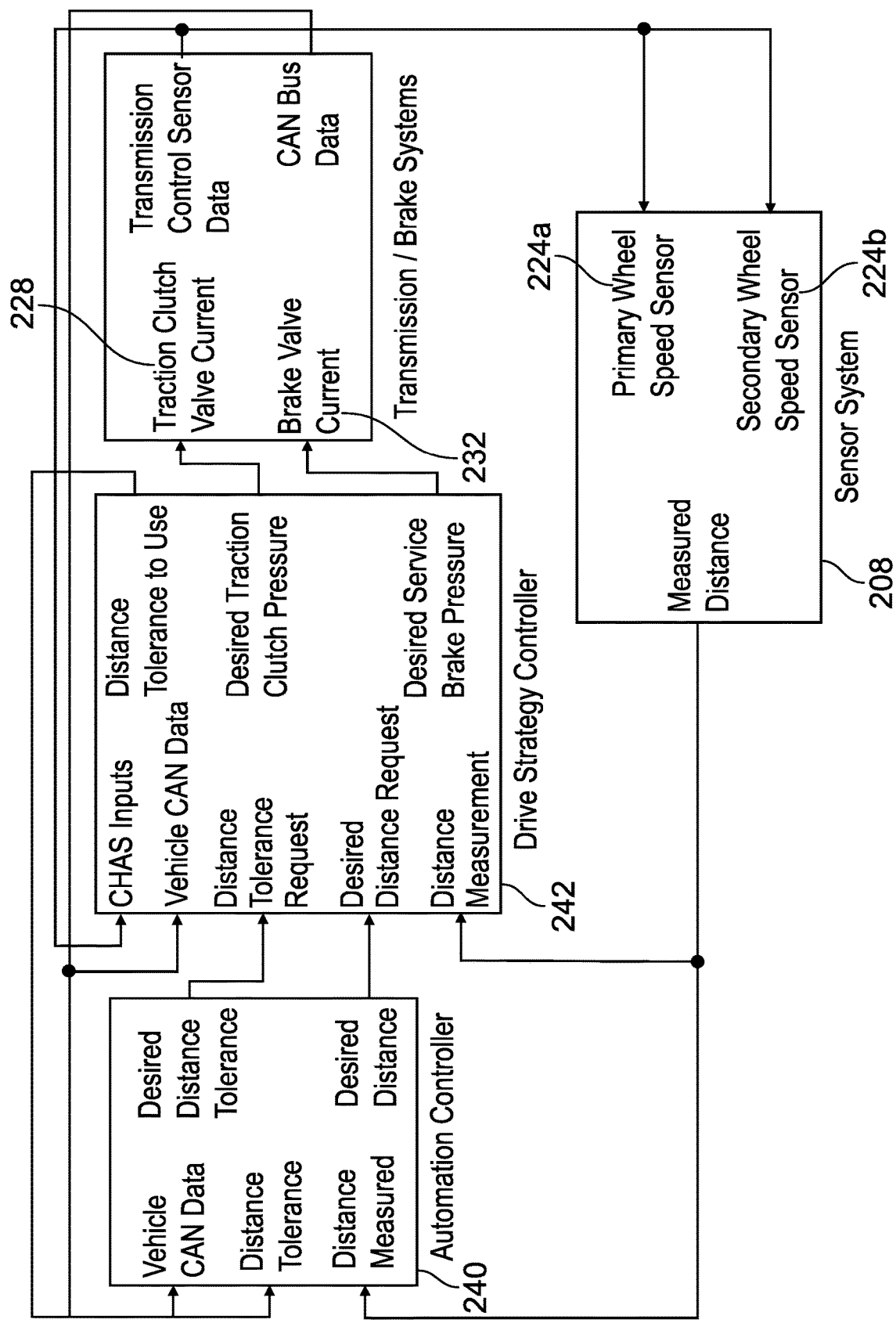
FIG. 5 illustrates another block diagram of a portion of the exemplary automated distance control system shown in FIG. 4.

FIG. 5 illustrates another block diagram of a portion of the exemplary automated distance control system 200 shown in FIG. 4. As shown, the controller 202 of the vehicle 102 can include at least an automation controller 240 and a distance control subsystem or drive strategy controller 242 that can communicate with each other, as well as other systems, components, or devices of the vehicle 102 via a CAN bus. The automation controller 240 can be configured to be utilized in connection with various automated features and capabilities of the vehicle 102. For example, according to certain embodiments, the automation controller 240 can be involved with providing instructions or information used in connection with an automated guidance system of the vehicle 102 that, with at least the assistance of information provided by the location system 218, can be used to steer the direction of travel of the vehicle 102. According to certain embodiments, the automation controller 240 can be used to determine a distance request that the vehicle 102 is to travel, as well as a distance tolerance request associated with that travel distance, as generally indicated by "Desired Distance" and "Desired Distance Tolerance", respectively, in FIG. 5.

As further indicated in FIG. 5, the Desired Distance Tolerance, which can correspond to the above-mentioned distance tolerance, and Desired Distance, or desired distance for the distance request, determinations by the automation controller 240 can be based on a variety of information from the sensor system 208, including, actual measurements, also referred to herein as measured distance, (e.g. "Measured Distance" in FIG. 5) that can be used by the automation controller 240 and/or the automation controller 240 to determine a "Distance Measured". As discussed above, and further indicated by FIG. 5, a variety or combination of speed sensors 224 can be utilized in connection with determining or measuring the distance traveled by the vehicle 102. For example, according to the embodiment shown in FIG. 5, the speed sensor 224 can comprise a primary wheel speed sensor 224*a* and a secondary wheel speed sensor 224*b*. By using two speed sensors 224*a*, 224*b* quadrature can allow for sensing a direction of rotation (e.g., clockwise or counterclockwise rotation) of a corresponding gear, which can be utilized by a controller, such as, for example, the automation controller 240, to determine a direction of travel of the vehicle 102/implement 100 (e.g., forward or reverse direction of travel).

The drive strategy controller 242 can, according to certain embodiments, be part of a controller utilized by either, or both, the transmission system 212 or the brake system 230. As shown, the automation controller 240 can communicate the determined "Desired Distance" and the "Desired Distance Tolerance" to the drive strategy controller 242 as a "Desired Distance Request" and a "Desired Distance Tolerance Request", respectively. The drive strategy controller 242 can utilize the information provided by at least the "Desired Distance Request" and "Desired Distance Tolerance Request" to generate signals that can control either or both the transmission actuator 228 (e.g., "Traction Clutch Valve" in FIG. 5) or the brake actuator 232 (e.g., "Brake Valve Current" in FIG. 5) in a manner that can control the movement and stoppage of the vehicle 102, including, but not limited to, the distance travel and the speed, acceleration, and deceleration of the vehicle 102 in moving the Desired Distance. For example, using information attained formed the Desired Distance Request signal, the drive strategy controller 242 can generate a signal(s), including a current, to the transmission actuator 228 such as, for example, a solenoid or valve (e.g., "Traction Clutch Valve Current" in FIG. 5) that controls a pressure of transmission fluid used by the transmission system 212 in a manner that can be used to attain at least the desired distance, as well as the speed, acceleration, and/or deceleration of such travel, of the vehicle 102, as indicated by the Desired Distance Request. Similarly, using information provided by the Desired Distance Request signal, the drive strategy controller 242 can generate a signal(s), including a current, to control or modulate the operation of the brake actuator 232 (e.g., "Brake Valve Current" in FIG. 5), to control or modulate an operation of the brake system 230, including pressure applied by the brakes of the brake system 230, in a manner that can be used to attain at least the desired distance, as well as the speed, acceleration, and/or deceleration of such travel, of the vehicle 102, as indicated by the Desired Distance Request.

The automation controller 240 and drive strategy controller 242 can also receive, via the CAN network, sensed data relating to the operation and movement of the vehicle 102 (e.g., "Vehicle 102 CAN Data") and the distance traveled by the vehicle 102 (e.g., "Distance Measured"). The Vehicle 102 CAN Data may be outputted by at least a portion of the sensor system 208, or via one or more sensors of the sensor system 208. For example, the automation controller 240 and drive strategy controller 242 can receive Vehicle 102 CAN Data that can indicate the speed of the vehicle 102, as indicated by a speed sensor 224, hydraulic pressures being provided in the transmission and brake system 230*s* via operation of the associated transmission actuator 228 or brake actuator 232, and/or captured information from the optical sensor(s) 214, as well as combinations thereof, among other information. The automation controller 240 and drive strategy controller 242 can also receive the above-discussed "Measured Distance" information. For example, the actual measurements "Measured Distance" information can correspond to transaxle speeds of vehicle 102, as determined via use of pulse counts by encoders of the speed sensor 224, and, moreover, in this example, the primary wheel speed sensor 224*a* and the secondary wheel speed sensor 224*b*. In such an embodiment, the number of pulses identified by the primary and second wheel speed sensors 224*a*, 224*b* can be used by the automation controller 240 and/or drive strategy controller 242 to determine a distance of travel, including, for example, in meters, among other units of measurement.

As also illustrated in FIG. 5, the drive strategy controller 242 can receive information (e.g., "CHAS Inputs" in FIG. 5) relating to the operation of the transmission (e.g., "Transmission Control Sensor Data" in FIG. 5). The transmission control sensor data can correspond to information provided by a controller of the transmission system 212, including, for example, information provided to the transmission controller from the transmission sensor 210.

As also seen in FIG. 5, the drive strategy controller 242 can be configured to determine the distance tolerance (e.g., "Distance Tolerance to Use" in FIG. 5) to be used in connection with attempting to precisely travel the desired distance, as indicated by Desired Distance Request. For example, in at least certain situations, various factors, tolerances, and capabilities of various components of the vehicle 102, as well as potential ambient environment conditions, can create issues with respect to the precision at which the system 200 can control the vehicle 102 so as to travel exactly, or nearly exactly, a distance that matches the desired distance identified by the Desired Distance Request. Moreover, the nature of the operation or design of certain types of transmission systems 212, including, for example, power shift transmissions versus continuously variable transmissions, can make operation of transmission system 212 in a manner that results in the vehicle 102 being stopped precisely at the particular desired distance identified by the Desired Distance Request at least challenging. Thus, using information regarding the systems, devices, or components of the vehicle 102, and/or inputted information or signals received by the drive strategy controller 242, the drive strategy controller 242 including, and associated processor 204 and information on a corresponding memory device 206, can identify a distance tolerance for the determined distance (e.g., "Distance Tolerance to Use") that the vehicle 102 is to travel. According to certain embodiments, the Distance Tolerance to Use communicated by the drive strategy controller 242 can be based, for example, on the capabilities or limitations of the vehicle 102, or associated systems. Thus, for example, the Distance Tolerance to Use can be provided to the drive strategy controller 242 to the automation controller 240 so as to generally guide the automation controller 240 of limits with respect to the determination, or adjustment, of a value(s) or range for the Desired Distance Tolerance outputted by the automation controller 240, and received by the drive strategy controller 242 as a Desired Tolerance Request. As seen in FIG. 5, the Distance Tolerance to Use can be communicated via the CAN network to the automation controller 240, and be received as the "Distance Tolerance".

Thus, the various inputs received by the automation controller 240 can be utilized by the automation controller 240 in determining commands relating to the Desired Distance Request and a Desired Tolerance Request that is communicated to the drive strategy controller 242. Similarly, each of the various inputs received by the drive strategy controller 242 can be utilized by the drive strategy controller 242 in determining commands to provide to at least the transmission actuator 228 and/or brake actuator 232 to attain a distance of travel for the vehicle 102 that corresponds to the information provided by the Desired Distance Request.

At least some information received by the automation controller 240 and the drive strategy controller 242 can be generally continuous, or be received at certain intervals, or be sent in response to the occurrence of a particular condition or event. Thus, over time, information received by the automation controller 240 and/or the drive strategy controller 242 can be updated, particularly as new information becomes available. Thus, the automation controller 240 and the drive strategy controller 242 can generally continuously update or provide additional commands or signals in response to the updated inputted information received by the automation controller 240 and/or the drive strategy controller 242. Thus, for example, as at least some information from the sensor system 208 is received by the automation controller 240 and/or the drive strategy controller 242, the automation controller 240 and/or the drive strategy controller 242 can be configured to make adjustments, if needed, with respect to previously communicated commands or signals outputted by either, or both, the automation controller 240 or the drive strategy controller 242, or to the operations of systems, devices, or components of the vehicle 102 that were in response to prior commands or signals from the automation controller 240 or the drive strategy controller 242. Thus, the system 200 can be configured to adapt as information or data is accumulated regarding at least the travel of the vehicle 102. Additionally, as the vehicle 102 and/or the associated towed implement 100 performs tasks during an operation, including, for example, an agricultural operation, the automation controller 240 and/or the drive strategy controller 242 can acquire new information or data with respect to additional tasks that are to be performed in connection with that operation.

While the embodiment shown in FIG. 5 is illustrated and discussed above with respect to the vehicle 102, at least certain aspects of the system 200, including, but not limited to the automation controller 240, drive strategy controller 242 and/or sensor system 208' can be part of the towed implement 100. For example, according to certain embodiments, the drive strategy controller 242 can communicate commands or signals from the towed implement 100 that are to be utilized by the transmission actuator 228 and/or brake actuator 232 to control the distance of travel, as well as the acceleration, deceleration, and/or speed of travel of either, or both, the vehicle 102 or the towed implement 100. Additionally, the Measured Distance can be obtained from one or more sensors that may be located at the towed implement 100, including, but not limited to, wheel speed sensors 224a, 224b, that detect information at the implement 100 that is used to determine a distance of travel, among other information.

Figure 6A:
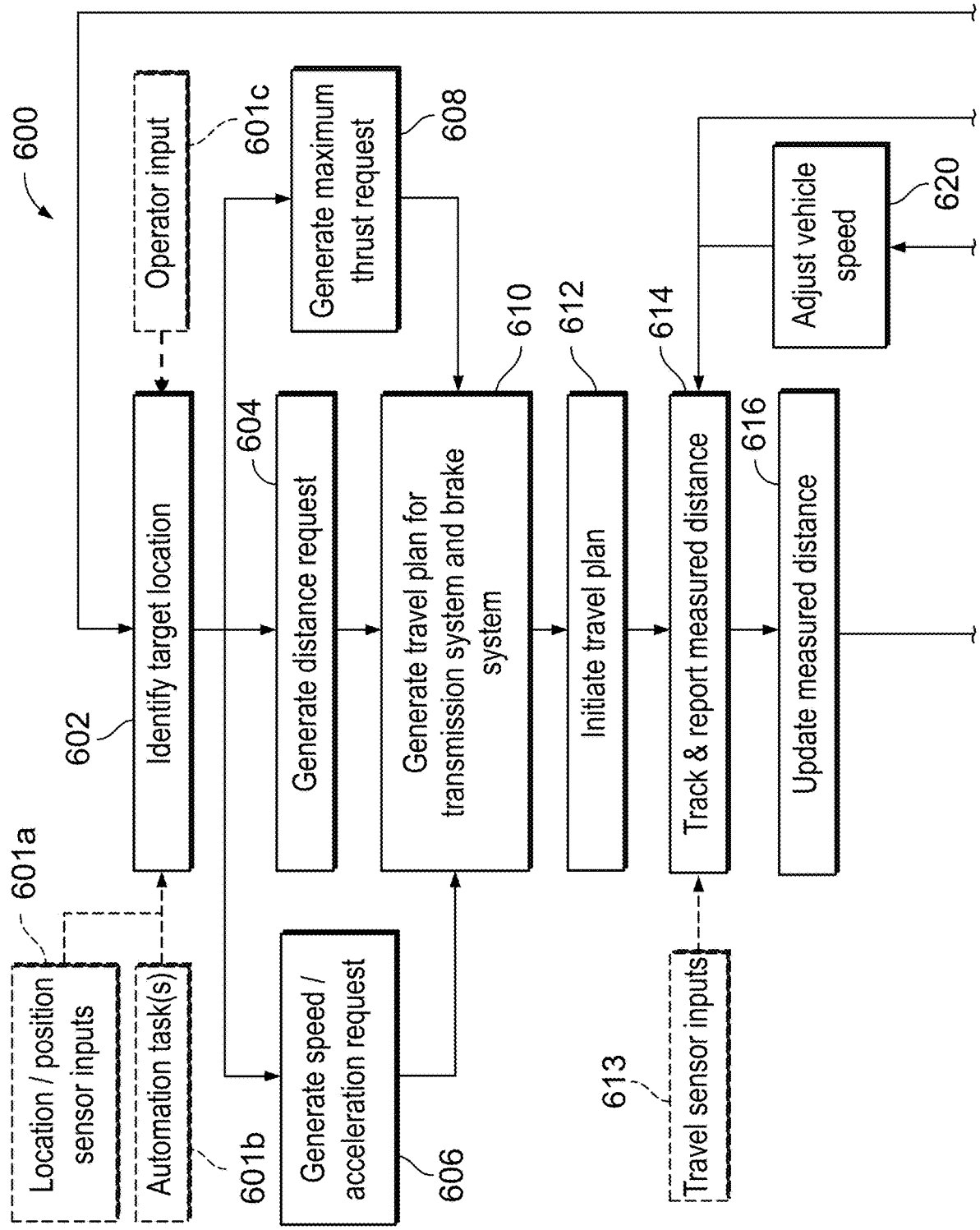
FIGS. 6A and 6B illustrate a simplified flow diagram of an exemplary method for operating the illustrated automated distance control system.
Figure 6B:
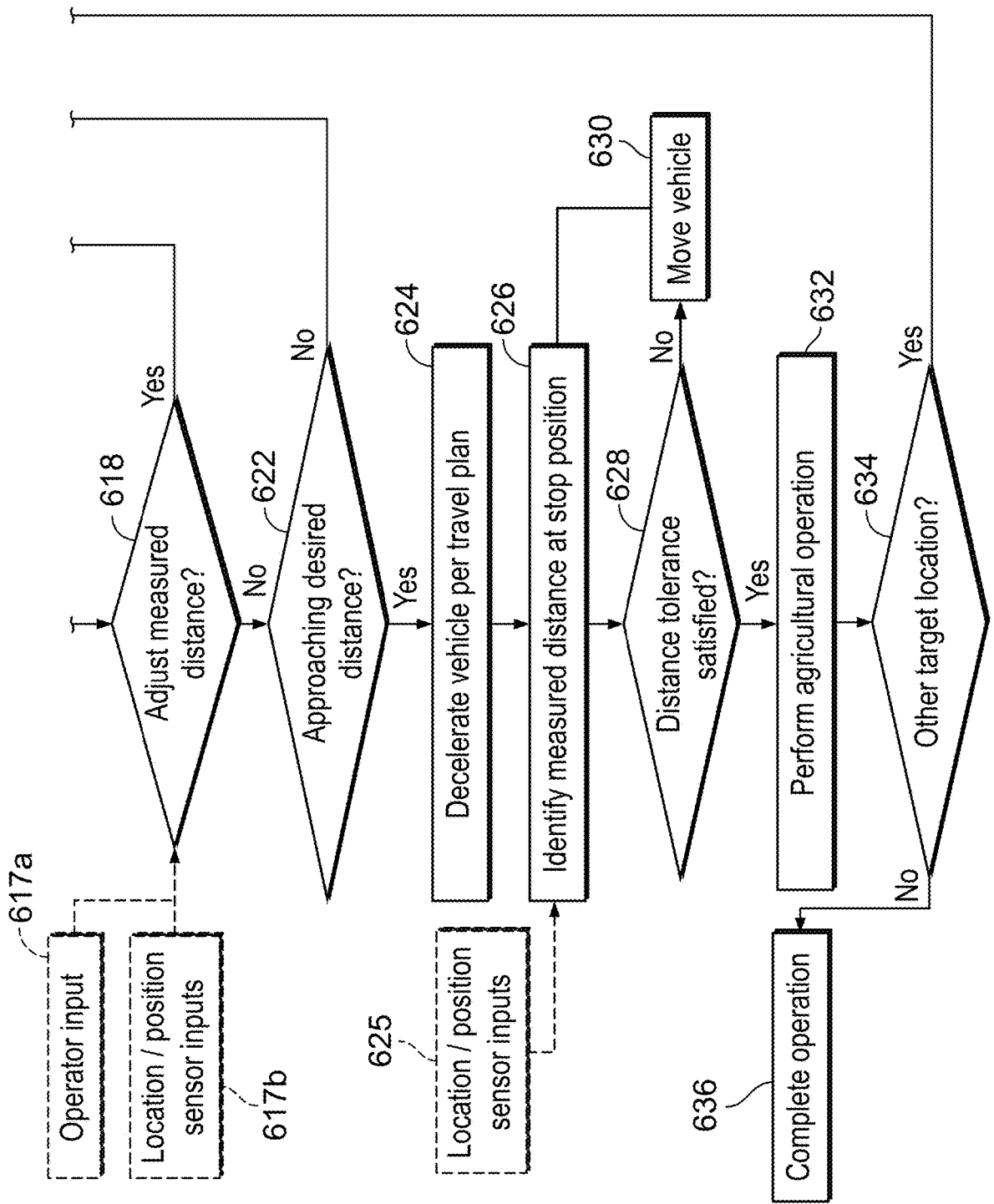

FIGS. 6A and 6B illustrate a simplified flow diagram of an exemplary method 600 for operating the illustrated automated distance control system 200. The method 600 is described below in the context of being carried out by the illustrated exemplary automated distance control system 200. However, it should be appreciated that method 600 can likewise be carried out by any of the other described implementations, as well as variations thereof. Further, the method 600 corresponds to, or is otherwise associated with, performance of the blocks described below in the illustrative sequence of FIGS. 6A and 6B. It should be appreciated, however, that the method 600 can be performed in one or more sequences different from the illustrative sequence. Additionally, while certain aspects to the method 600 may be described below with respect to the controller 202 of the vehicle 102, such features can additionally, or alternatively, be performed by other controllers of the system 200, including, but not limited to the controller 202' of the towed implement 100.

At block 602, a target location to which the vehicle 102 is to travel can be identified. For example, referencing FIG. 1, a first target location ("$t_1$") can be identified at block 602. Such an identification can occur in a variety of different manners. Moreover, a variety of different types of information can be inputted for the controller 202, including, but not limited to, the automation controller 240, that can provide or be used to identify the target location. For example, as indicated by block 601a, according to certain embodiments, the target location can be identified by the controller 202 using information provided by one or more location or position sensors. For example, one or more of the optical sensors 214 can capture information in a viewable area outside of the vehicle 102 containing one or more fiducial markers. In such a situation, the controller 202, including the processor 204, can be configured to identify the fiducial marker(s) within the captured information, including, for example, via use of optical recognition, among other manners of identification. Additionally, or alternatively, the target location can be based on the location at which an automated task is to be performed using the vehicle 102 and/order toward implement 100, as generally indicated by block 601b. For example, according to certain embodiments, when performing an operation, the automation controller 240 may retrieve/receive information, for example, from a memory device 206, or otherwise receive instructions from another device, indicating a location at which the vehicle 102 and/or implement 100 are to be positioned. Further, according to certain embodiments, the controller 202 can receive an identification of the target location by information inputted by an operator, including, for example, by use of an I/O device 226. For example, according to certain embodiments, an operator can provide coordinates for the target location. Further, according to certain embodiments, the operator can identify a location in an image, video, or map shown on and I/O device 226 that corresponds to the target location.

Using the identified target location, at block 604, the controller 202, including, for example, the automation controller 240, can identify a distance that the vehicle 102 and/or implement 100 is/are to travel to reach the target location. For example, the controller 202 can identify the travel distance by using GPS coordinates for the vehicle 102/implement 100 and the target location. Additionally, the travel distance can correspond to a distance that a particular location or area of the vehicle 102 or implement 100 is to travel. For example, according to certain embodiments in which the implement 100 is a grain cart, the travel distance can correspond to a distance at which an auger or other convenience means of the conveyance assembly 132 is to travel so as to be positioned at the target location. Thus, for example, information regarding the distance between a GPS receiver of the vehicle 102/implement 100 and the location of the auger can be used in connection with generating a distance request that can provide the desired distance for a particular portion/area of the grain cart to reach, or be positioned within an acceptable tolerance (e.g., distance tolerance) of, the target location. A determination of the desired distance can be utilized in connection with the controller 202, including, for example, the automation controller 240, communicating a Desired Distance Request via the CAN network to the drive strategy controller 242, as previously discussed, for example, with respect to FIG. 5. For instance, referencing the example provided by at least FIG. 1, at block 604 the controller 202 can generate a first distance request that indices or provides a first desired distance ("$d_1$") that the vehicle 102 and/or implement 100 is/are to travel such that a particular location on the implement 100 moves from an initial position ("$p_0$") to the first identified target location ("$t_1$") that is associated with the vehicle 102/implement satisfying the first distance request, or being within the distance tolerance of the desired distance of the first distance request.

Additionally, information regarding the first distance request, as discussed above with respect to block 602 and 604, respectively, can be used by the controller 202 to generate a travel movement request that can correspond to either, or both, a speed of travel or an acceleration for either or both the vehicle 102 and the implement 100. With respected to the embodiment shown in FIG. 5, such a travel movement request can be generated by either, or both, the automation controller 240 or the drive strategy controller 242. The travel movement request can be based on a variety of different criteria, including, for example, the desired distance that the vehicle 102/implement 100 is to travel, the weight of the implement 100, the power that can be provided by the prime mover 120, and the direction at which the vehicle 102/implement 100 is to travel, as well as various combinations thereof, among other criteria.

In at least certain situations, the method 600 can further include generation of a maximum thrust request at block 608. The maximum thrust request can, for example, relate to the force at which the vehicle 102, including, for example, the hitch 118 that is coupled to the vehicle 102, engages the implement 100 when the implement 100 is being attached to the vehicle 102. Additionally, or alternatively, the maximum thrust request can relate to the force that is exerted, directly or indirectly, by the vehicle 102 on the towed implement 100. For example, according to certain embodiments, the maximum thrust request can correspond to the maximum force that can be exerted upon the implement 100 via a pulling or pushing force provided by the vehicle 102 so as to prevent, or minimize, potential damage to the implement 100.

Using the information provided by any one, or any combination, of blocks 602, 604, 606, and 608, the controller 202 can generate a travel plan. With respect to the embodiment discussed above with respect to FIG. 5, such a travel plan can be generated by the drive strategy controller 242. Moreover, according to certain embodiments, the travel plan can relate to the manner in which the transmission actuator 228 and/or brake actuator 232 are to be operated so as to move the vehicle 102 and/or implement 100 to the target location, as well as the speeds, acceleration, and/or deceleration that is to occur during such travel in connection with satisfying, including being within a distance tolerance, of the desired distance of the distance request.

At block 612, the controller 202, including, for example, the drive strategy controller 242, can initiate the travel plan that was generated at block 610. According to certain embodiments, the generated travel plan can be utilized by the drive strategy controller 242 to determine, or otherwise provide, the manner in which at least the transmission actuator 228 and/the brake actuator 232 is/are to be modulated. Thus, for example, at block 612 the drive strategy controller 242 can communicate via the CAN network a signal(s), including, for example, a current, to either or both the transmission sensor 210 and the brake sensor. Such signals can, for example, at least partially release an engagements of the brakes of the brake system 230 so as to accommodate movement or travel of the vehicle 102 and implement 100. Additionally, such signals can also be used to engage gear(s) of the transmission system 212 such that a propulsion force generated by the prime mover 120 is transmitted to the engagement bodies 124 such that the vehicle 102 and implement 100 moves in a particular direction of travel, such as, for example, a in forward direction of travel toward, and to, the target location, and, moreover in connection with satisfying the distance request. Additionally, such a signal can be used to engage a particular gear of the transmission system 212, and/or release a brake of the brake system 230, such that the vehicle 102 and implement 100 travels at a particular predetermined speed and, at least initially, with a particular predetermined acceleration, that can correspond to at least the travel movement request discussed above with respect to block 606.

At block 614, as the vehicle 102 and implement 100 move, the Measured Distance can be recorded. As previously discussed, the distance of travel can be measured in a variety of manners, including, for example, via information obtained from one or more sensors of the sensor system 208, as generally indicated by block 613. For example, as previously discussed with respect to the embodiment illustrated in FIG. 5, a Measured Distance can be determined, at least in part, using information obtained by either, or both, a primary wheel speed sensor 224a and/or secondary wheel speed sensor 224b. Further, as also discussed with respect to the example provided in FIG. 5, a variety of other information regarding such movement or distance traveled can be provided to automation controller 240 and/or the drive strategy controller 242 via the CAN network. Additionally, as previously discussed, the automation controller 240 and/or the drive strategy controller 242 can also receive vehicle 102 CAN data that can indicate, or be used to determine, at least a speed of travel of the vehicle 102 or implement 100.

As the vehicle 102 and/or implement 100 travels, the distance of travel can be measured such that the measured distance can be determined, such as, for example, by the automation controller 240 and/or the drive strategy controller 242. Moreover, at block 616, the measured distance can be adjusted as the vehicle 102 and/or implement 100 travels or otherwise changes location. As previously mentioned, the measured distance, can increase as the vehicle 102/implement 100 travels in a first direction (e.g., forward direction), and decreased as the vehicle 102/implement 100 travels in a second direction (e.g., reverse direction). Further, as previously discussed, the measured distance can be reset to zero with, or before, each individual activation or key-on of the vehicle 102. Thus, according to the example provided by FIG. 1, if the vehicle 102 is activated or keyed-on at the initial position ("$p_0$"), the measured distance can incrementally increase from zero as the vehicle 102/implement 100 travels in a generally forward direction from that initial position ("$p_0$") and to the first target location ("$t_1$") in connection with the vehicle 102/implement 100 traveling the desired distance. Additionally, the automation controller 240 and/or the drive strategy controller 242 can monitor and determine whether the measured distance does, or does not, satisfy that desired distance of the Desired Distance Request.

According to certain embodiments, as the vehicle 102 and implement 100 travel towards a target location, the controller 202, including, for example, the automation controller 240 or the drive strategy controller 242, can continue to receive information regarding measured distance. For example, as the difference between the measured distance and the desired distance decreases, the operator and/or the sensor system 208 can provide updated and/or more accurate information regarding the particular location of the target location that is associated with the desired distance. Further, for example, as indicated by block 617a, the operator can, via the I/O device 226, input information that may further clarify, or adjust, the target location, and thereby adjust the desired distance associated with the vehicle 102/implement being positioned at that target location.

According to certain embodiments, the controller 202 can relatively continuously receive information, or updated information, regarding the measured distance, or relating to differences between the desired distance and the measured distance. For example, in certain instances, one or more of the engagement bodies 124 can experience slippage relative to the ground surface wherein the engagement bodies 124 rotates without corresponding travel by the vehicle 102. With at least certain types of manners in which distance traveled can be measured, including, for example, via accumulating wheel speed pulse counts from a drive train of the vehicle 102, such rotation of the engagement bodies 124 during such slippage can result in the measured distance changing (e.g. incrementing or decrementing) without an associated change in the location of the vehicle 102/implement 100. In such a situation, the continuously updated information provided to the controller 202 can result in the controller 202 adjusting the desired distance, thereby rendering moot any potential error that may have otherwise been associated with changes in the measured distance when the engagement body 124 experienced slippage.

Similarly, one or more sensors of the sensor system 208, including, for example, an optical sensor 214, can continue to obtain information regarding the target location that may improve with respect to at least the precision of the information as to the distance between the vehicle 102/implement 100 and target location decreases. Thus, at block 618, using such information that is received after the target location was identified at block 602, the controller 202 can determine whether to update or adjust the measured distance and/or the desired distance. For example, according to certain embodiments, such an adjustment may relate to adjusting the desired distance that had previously been determined to correspond to the distance that the vehicle 102/implement 100 is to travel to reach the target location. If a determination is made at block 618 that the controller 202 is to adjust the desired distance, including, for example, the desired distance traveled count value, then at block 620 the controller 202 can also determine whether other aspects of the travel plan that was generated at block 610 are to also change, including, for example, the speed at which the vehicle 102/implement 100 is/are to travel. If such adjustment is made to the generated travel plan, including the speed of the vehicle 102/implement 100 and an associated acceleration of the vehicle 102/implement 100, such an adjustment can occur at blocked 620, and the controller 202 can continue with updated the measured distance at block 614.

At block 622, the controller 202 can determine whether the vehicle 102/implement 100 is approaching the desired distance and/or the target location associated with the desired distance. For example, as previously discussed, according to certain embodiments, the controller 202 can utilize the measured distance, including, for example, the measured distance count value, in view of the desired distance, or desired distance count value that was previously determined at block 604 or block 618 to determine if the vehicle 102/implement 100 is approaching the desired distance and/or target location. Additionally, or alternatively, the controller 202 can receive information from one or more sensors of the sensor system 208, including, for example, the optical sensor 214, to determine, or confirm, whether the vehicle 102/implement 100 is approaching the desired distance and/or the associated target location. Further, according to certain embodiments, the controller 202, including, for example, the automation controller 240 and/or the drive strategy controller 242, can determine or confirm that the vehicle 102/implement 100 is approaching the desired distance and/or target location using information provided by the location system 218, including, for example, the current GPS coordinate(s) of the vehicle 102/implement 100 relative to the previously identified GPS coordinate(s) for the desired distance and/or the target location. If the controller 202 however determines at block 622 that the vehicle 102/implement 100 is not approaching the desired distance or target location, then as seen in FIGS. 6A and 6B, according to certain embodiments, the controller 202 can continue with monitoring the measured distance, as indicated by block 614.

If the controller 202 determines at block 622 that the vehicle 102/implement 100 is approaching the desired distance and/or target location, then at block 624 the controller 202 can issue one or more commands to initiate deceleration of the vehicle 102/implement 100. Such instructions can include instructions to the brake actuator that increases a friction applied by brake pads of the brake system 230, and/or instructions to the transmission actuator 228 that can change at least the gear of engagement and/or otherwise adjust the amount of power from the prime mover 120 that is transmitted to the engagement bodies 124. Such deceleration of the vehicle 102 can be in accordance with, or part of, the travel plan generated at block 610.

The timing at which deceleration occurs can be based on a variety of different parameters, including, but not limited to, the speed at which the vehicle 102 is moving, a deceleration limit, and the distance remaining until the vehicle 102/implement 100 reaches the desired distance and/or target location. As previously discussed, the speed of the vehicle 102 can be determined in a variety of different manners, including, for example, as detected using information from one or more of the speed sensors 224 such as, for example, a speed sensor 224 that can detect wheel speed, radar speed, and/or GPS speed, among other manners of determining the speed of the vehicle 102/implement 100. Further, the remaining distance before the vehicle 102/implement 100 reaches the desired distance and/or target location can be determined in a variety of different manners, including, for example, determining a difference between the measured distance and the desired distance and/or to the target location.

In connection with the timing at which deceleration of the vehicle 102/implement 100 is to occur, the controller 202, including, for example, the automation controller 240 or the drive strategy controller 242, can determine the distance required for the vehicle 102/implement 100 to stop at the desired distance and/or target location. Such a determination can be based, at least in part, on a determination of the time that it may take for the vehicle 102/implement 100 to come to a stop, and/or the distance that may be required for the vehicle 102/implement 100 to stop at the desired distance and/or target location. According to certain embodiments, the time to stop, or stop time, can be determined using the following equation:

$$stopTime = \frac{tracSpd}{decelLmt} + \frac{decelLmt}{MaxJerk} \quad (1)$$

wherein stopTime is time during deceleration needed for the vehicle 102 to stop, tracSpd is the speed of the vehicle 102/implement 100, decelLmt is the deceleration limit, and MaxJerk is the maximum allowed jerk.

Knowing the travel speed of the vehicle 102/implement 100, and either determining the stop time or having knowledge of the deceleration limit, the Distance needed for stopping the vehicle 102/implement 100 at the desired distance and/or target location can be determined using below Equation (2):

$$stopDist = \frac{tracSpd^2}{2*decelLmt} + \frac{tracSpd*decelLmt}{2*MaxJerk} \quad (2)$$

wherein stopDist is the distance needed during deceleration for the vehicle 102 to stop, tracSpd is the speed of the vehicle 102/implement 100, decelLmt is the deceleration limit, and MaxJerk is the maximum allowed jerk.

Figure 9:
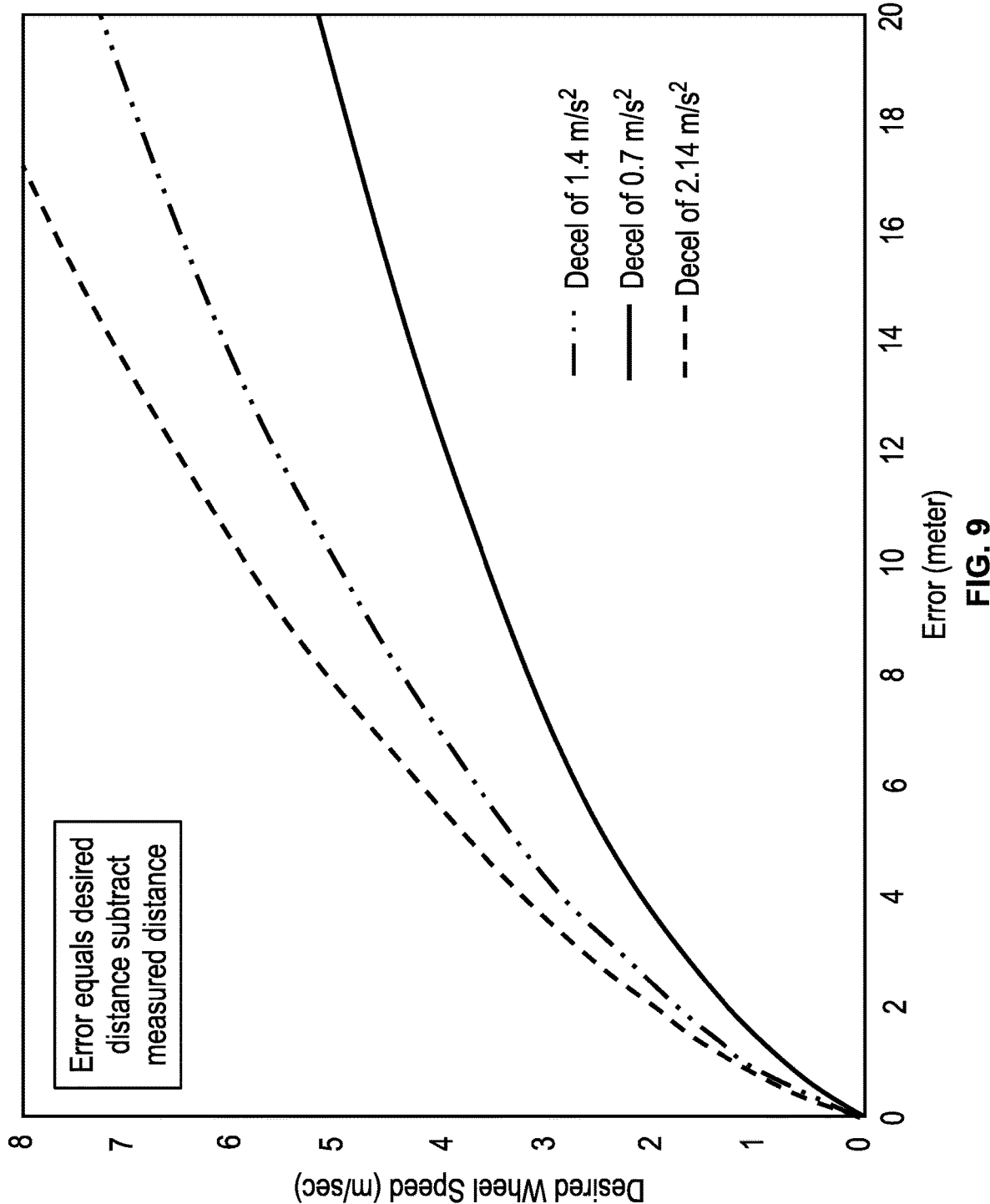
FIG. 9 illustrates information for an exemplary look-up table (LUT) for three selected deceleration rates that can identify a distance to begin deceleration of a vehicle and implement in an attempt to reduce jerk.

Further, if the distance that is to be traveled before stopping at the desired distance and/or target location is determined, a deceleration rate for the travel of the vehicle 102/implement 100 can be determined using the following equations:

$$distErr = distDes - distMeas \quad (3)$$

$$decelNeed = \frac{1}{2}tracSpd^2/distErr \quad (4)$$

wherein distErr is the distance remaining to travel by the vehicle 102/implement 100 before reaching the desired distance of the distance request, distDes is the desired distance of the distance request, distMeas is the measured distance the vehicle 102/implement 100 has traveled, and tracSpd is the speed of the vehicle 102/implement 100. However, such an approach does not take into account reducing jerk as the vehicle 102/implement 100 approaches a stop. Accordingly, optionally, with respect to select deceleration rates, look up tables can be utilized to interpolate, such as, for example, via an algorithm, a desired deceleration rate. In an attempt to reduce jerk, such an approach can allow for shaping the final portion, including the last few meters, of a travel of the vehicle 102/implement 100 before the vehicle 102/implement 100 comes to a stop. For example, FIG. 9 illustrates information for an exemplary look-up table (LUT) for three selected deceleration rates that can identify a distance to begin deceleration of a vehicle and implement in an attempt to reduce jerk. In the example shown in FIG. 9, if the vehicle 102/implement 100 was traveling at a wheel speed of 4 meters per second (m/s), and the desired deceleration rate was 0.7 meters per second squared (m/s²), information from the LUT corresponding to the information provided in FIG. 9 would indicate that deceleration, in this example, is to begin at 12 meters (m) from the stopping point of the vehicle 102/implement 100. Likewise, if the wheel speed was again 4 m/s, but the desired deceleration rate was 2.1 m/s², as demonstrated by FIG. 9, information from the LUT would indicate that, in this example, is to begin at 5.8 meters (m) from the stopping point of the vehicle 102/implement 100.

The vehicle 102/implement 100 can continue to decelerate until the vehicle 102/implement 100 stops at, or around, the desired distance and/or target location at block 626. The particular location at which the vehicle 102/implement 100 stops can be detected and communicated to the controller 202, including, for example, the automation controller 240 and/or the drive strategy controller 242, in a variety of manners, including, for example, by information provided by one or more sensors of the sensor system 208 and/or the location system 218, as generally indicated by block 625. At block 628, the location at which the vehicle 102/implement 100 was stopped, as indicated via information from block 626, can be compared to the desired distance and/or target location identified at block 602. Moreover, and block 628, the controller 202 can make a determination as to whether the vehicle 102/implement 100 was stopped any distance from the desired distance and/or target location that is within a distance tolerance, as discussed, for example, above with respect to FIG. 5 and the information provided by at least the Desired Tolerance Request or distance tolerance. Thus, for example, the controller 202 can make a determination as to whether the vehicle 102/implement 100 is within a certain distance, such as, for example, a range, that can satisfy the distance tolerance. According to certain embodiments, whether the distance tolerance is, or is not, satisfied, can be based on a comparison by the controller 202 of the difference between the measured distance and the desired distance and/or target location.

Figure 3:
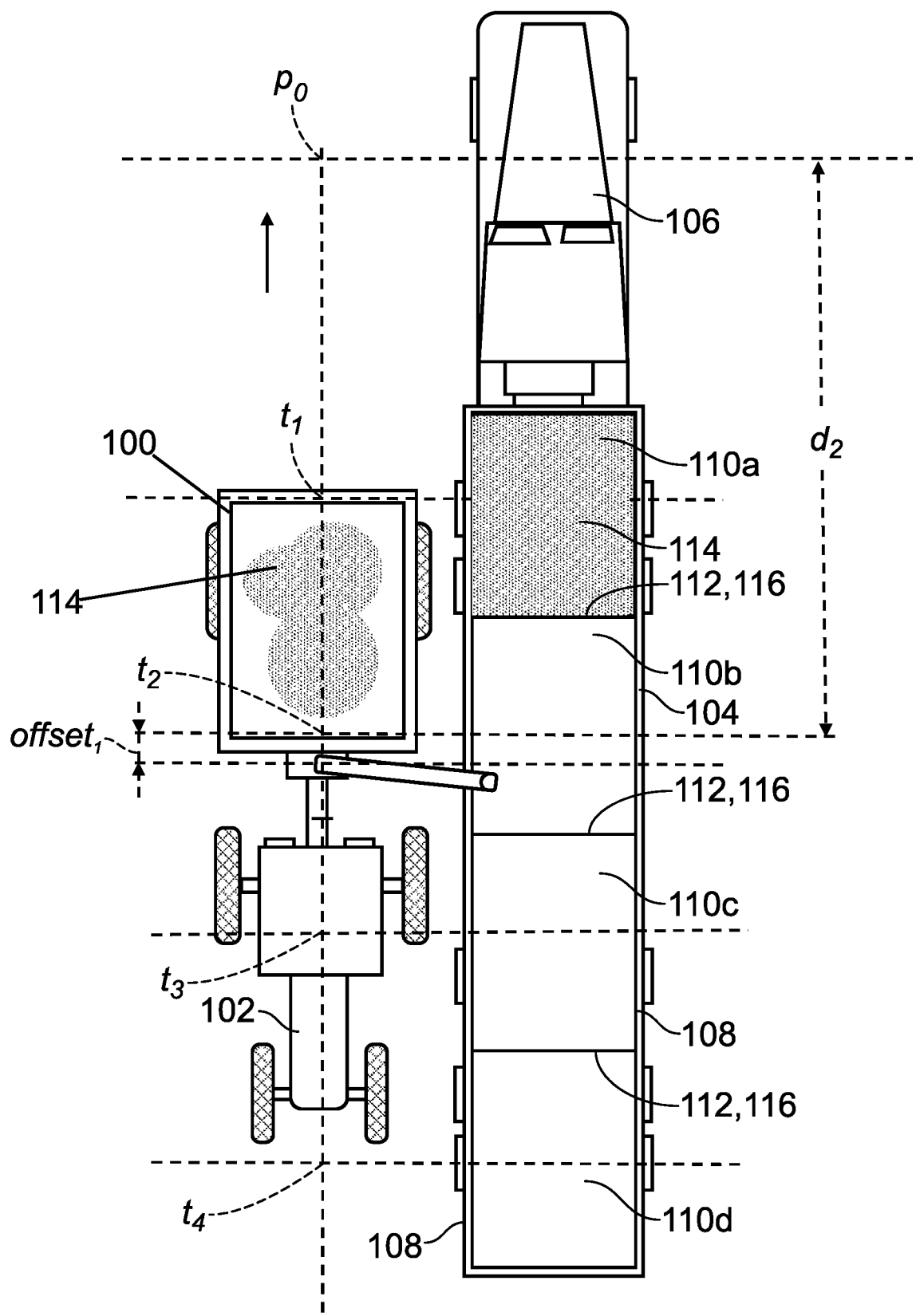
FIG. 3 illustrates the exemplary agricultural operation shown in FIGS. 1 and 2, and in which, after completing an operation at the first target location, the agricultural vehicle and towed implement have moved, in response to a second distance request, to a location that is offset from a second target location.

If the controller 202 determines that the distance tolerance is not satisfied, then at block 630, the controller 202 can determine a distance that the vehicle 102/implement 100 is to be moved in either the forward or rearward direction so as to at least satisfy the distance tolerance. For example, the controller 202 can use the difference between the desired distance the controller 202 previously determined would correspond to the vehicle 102/implement 100 being at the target location and the measured distance associated with the actual distance of travel of the vehicle 102/implement 100 to determine the extent, and direction, the vehicle 102/implement 100 is to travel to satisfy the distance tolerance. For example, FIG. 3 illustrates an embodiment in which the vehicle 102/implement 100 has traveled beyond a second target location ("$t_2$" in FIG. 3). In such an example, the controller 202 may have previously determined a second desired distance corresponding to the distance the vehicle 102/implement 100 would travel from the initial position ("$p_0$" in FIG. 1) to reach the second target location ("$t_2$"), even if the vehicle 102/implement 100 had previously stopped, or will be stopping, upon traveling a first desired distance, the first desired distance corresponding to a distance of travel to satisfy the of the first distance request and/or reach a first target location ("$t_1$").

In the particular example shown in FIG. 3, in traveling a second desired distance of a second distance request to reach the second target location, the vehicle 102/implement 100 has traveled beyond second desired distance, and thus exceeded the second distance request and corresponding second target location ("$t_2$") by a first offset distance ("offset$_1$" in FIG. 3). Thus, as the vehicle 102/implement 100 has traveled beyond the second target location, the measured distance for the distance actually traveled by the vehicle 102/implement 100 can be larger than the second desired distance of the second distance request that had previously been determined would correspond to the vehicle 102/implement 100 reaching the second target location relative to the initial position ("$p_0$"). In such a situation, the controller 202 can determine whether such a difference in the measured distance and the second desired distance of the second distance request, is, or is not, within the distance tolerance. If the controller 202 determines that the distance tolerance is not satisfied, then using the differences in the measured distance and the distance tolerance, the controller 202 can determine both the direction of travel and the distance the vehicle 102 or implement 100 is to travel to be within the distance tolerance of the second distance request. For example, using above-identified Equation (3), a negative value for the distance error ("distErr") can indicate to the controller 202 that the vehicle 102/implement 100 traveled beyond the distance tolerance of the second distance request, and thus is to be moved in a rearward direction by a distance that will place the vehicle 102/implement 100 at a location that is within the distance tolerance of the second distance request. Conversely, a positive value for the distance error ("distErr") can indicate to the controller 202 that the vehicle 102/implement 100 stopped too soon, and is to be moved in a forward direction, as well as the distance to move in the forward direction to satisfy the distance tolerance of the second distance request.

Therefore, in the event the vehicle 102/implement 100 traveled too far beyond the distance tolerance of the second distance request, the controller 202 can, at block 630, issue instructions that can be used to operate at least the transmission actuator 228 and/or brake actuator 232 so as to facilitate rearward travel of the vehicle 102/implement 100. Additionally, as previously discussed, according to certain embodiments, if the vehicle 102/implement 100 is moved in the generally rearward direction, the measured distance can be decreased in an amount that corresponds to the distance that the vehicle 102/implement 100 has moved in the rearwardly direction. Conversely, if the vehicle 102/implement 100 is moved in the generally forward direction, the measured distance can continue to be increased in an amount that can correspond to the distance that the vehicle 102/implement 100 moves in the forward direction. Accordingly, the method 600 can return to block 626, at which the subsequent stop position of the vehicle 102/implement 100 can be identified and subsequently evaluated in connection with the distance tolerance at block 628.

Figure 2:
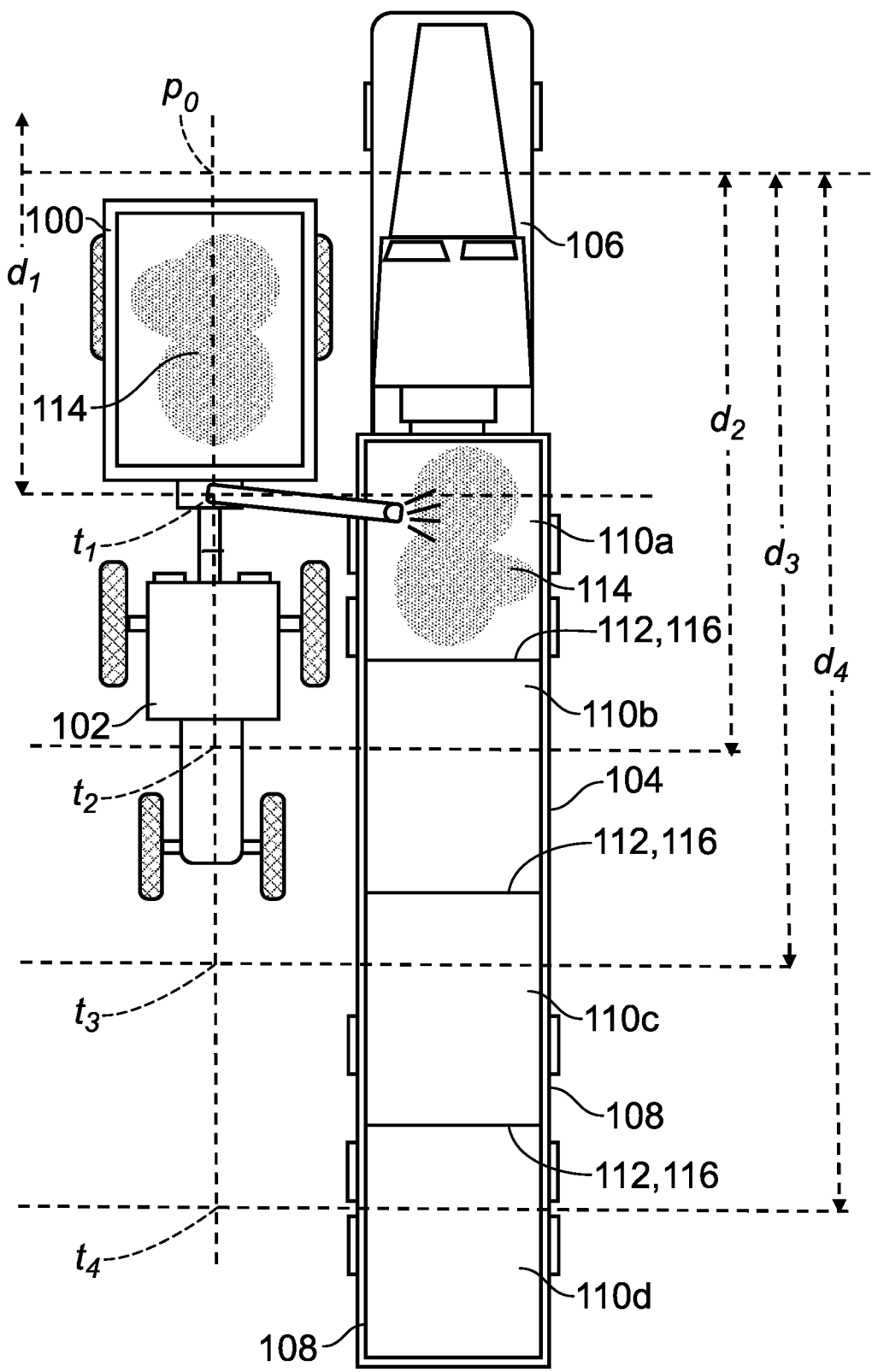
FIG. 2 illustrates the exemplary agricultural operation shown in FIG. 1 at which the agricultural vehicle and towed implement have been moved, in response to a first distance request, from an initial position such that the agricultural vehicle and towed implement stops at a first target location.

According to certain embodiments, upon a determination that the distance tolerance of the second distance request has been satisfied, an agriculture operation can be performed at block 632. The type of agricultural operation performed can vary, and can at least partially depend on the type of vehicle 102 and/or implement 100 being used. For example, with respect to the example shown in FIGS. 1 and 2, the above discussed method 600 can be utilized in connection with the travel of the vehicle 102/implement 100 a first desired distance ("$d_1$") from the initial position ("$p_0$") to the first target location ("$t_1$"). In such a situation, upon the controller 202 determining at block 628 that the vehicle 102/implement 100 has traveled a distance at which the stop location of the vehicle 102/implement satisfies the distance tolerance with regard to the first distance request, the implement 100, which in this example is a grain cart, can begin the process of unloading grain into a first storage compartment 110a of the trailer 104 at block 632.

The agriculture operation can continue at block 632 until the controller 202, including, for example, the automation controller 240, receives information or otherwise determines that the particular operation, or part of the operation, is completed. For example, in the illustrated example in which the implement 100 is a grain cart, the sensor system 208' of the implement 100 can include a height sensor 236 (FIG. 4) that can detect when a height of grain deposited into the storage compartment 110a of the trailer 104 has reached a predetermined height or limit. In this example, in such a situation, with respect to the unloading of grain into that particular storage compartment 110a, the unloading operation can then be deemed completed. Such completion can further be communicated to, or otherwise detected by, the controller 202 of the vehicle 102 such that a determination can be made at block 632 that the agricultural operation has at least temporarily concluded or been suspended.

At block 634, the controller 202 can determine if another agricultural operation is to be performed. For instance, in the example illustrated in FIGS. 1-3 in which the implement 100 is a grain cart, following a determination by the controller 202 of either or both the vehicle 102 or implement 100 that unloading of grain into one of the storage compartments 110a-d of the trailer 104 has been completed, a determination can be made as to whether the grain cart is to again be used to unload grain into at least another storage compartment 110a-d. Thus, upon a determination that unloading of grain into the first storage compartment 110a of the trailer 104, as seen, for example, in FIG. 2, has been completed, then at block 634 a determination can be made that grain is to next be unloaded into a second storage compartment 110b, as shown, for example, in FIG. 3. Thus, as another agricultural operation is to be performed, the method 600 can return to block 602, and the method 600 can be performed with respect to moving the vehicle 102/implement 100 until the measured distance corresponds to the second desired distance ("$d_2$") of the second distance request, or is within the distance tolerance of the second desired distance of the second distance request. Thus, upon traveling the second desired distance, the vehicle 102/implement 100 is expected to be at the corresponding second target location ("$t_2$"), wherein the implement 100 is to be positioned to unload grain into the second storage compartment 110b. Further, in this example, following completion of the unloading grain into the second storage compartment 110b, the method 600 can again be repeated to move the vehicle 102/implement 100 until the measured distance reaches the third desired distance ("$d_3$") of a third distance request, or is within the distance tolerance of the third distance request. In this example, after traveling the third desired distance of the third distance request, the vehicle 102/implement 100 is expected to be at a corresponding third target location ("$t_3$") at which the implement 100 is to be positioned to lower grain into the third storage compartment 110c. The vehicle 102/implement 100 can subsequently move until the measured distance reaches the fourth desired distance ("$d_4$") of a fourth distance request, or is within the distance tolerance of the fourth distance request. Upon satisfying the distance tolerance of the fourth distance request, the vehicle 102/implement 100 is expected to be at a corresponding fourth target location ("$t_4$") at which the implement 100 can be positioned to lower grain into the fourth storage compartment 110d.

Upon a determination at block 634 that the agricultural operation(s) has/have been completed, the method 600 can proceed to block 636, where the operation can be determined to be completed. According to certain embodiments, such completion of the operation can include generating another distance request corresponding to the vehicle 102/implement 100 traveling to a location where the vehicle 102/implement 100 is to be moved or otherwise located following completion of an agricultural task. For example, according to certain embodiments, upon completion of an agricultural operation, the controller 202, including, for example, the automation controller 240 or the drive strategy controller 242, or both, can be utilized to generate a distance request for returning the vehicle 102/implement 100 to a storage or staging location, among other locations. Such travel of the vehicle 102/implement 100 to the storage or staging location can similarly involve at least blocks 602 through 628 such that the system 200 can control the travel of the vehicle 102/implement 100 to the storage or staging location in a manner similar to that discussed above.

Figure 7A:
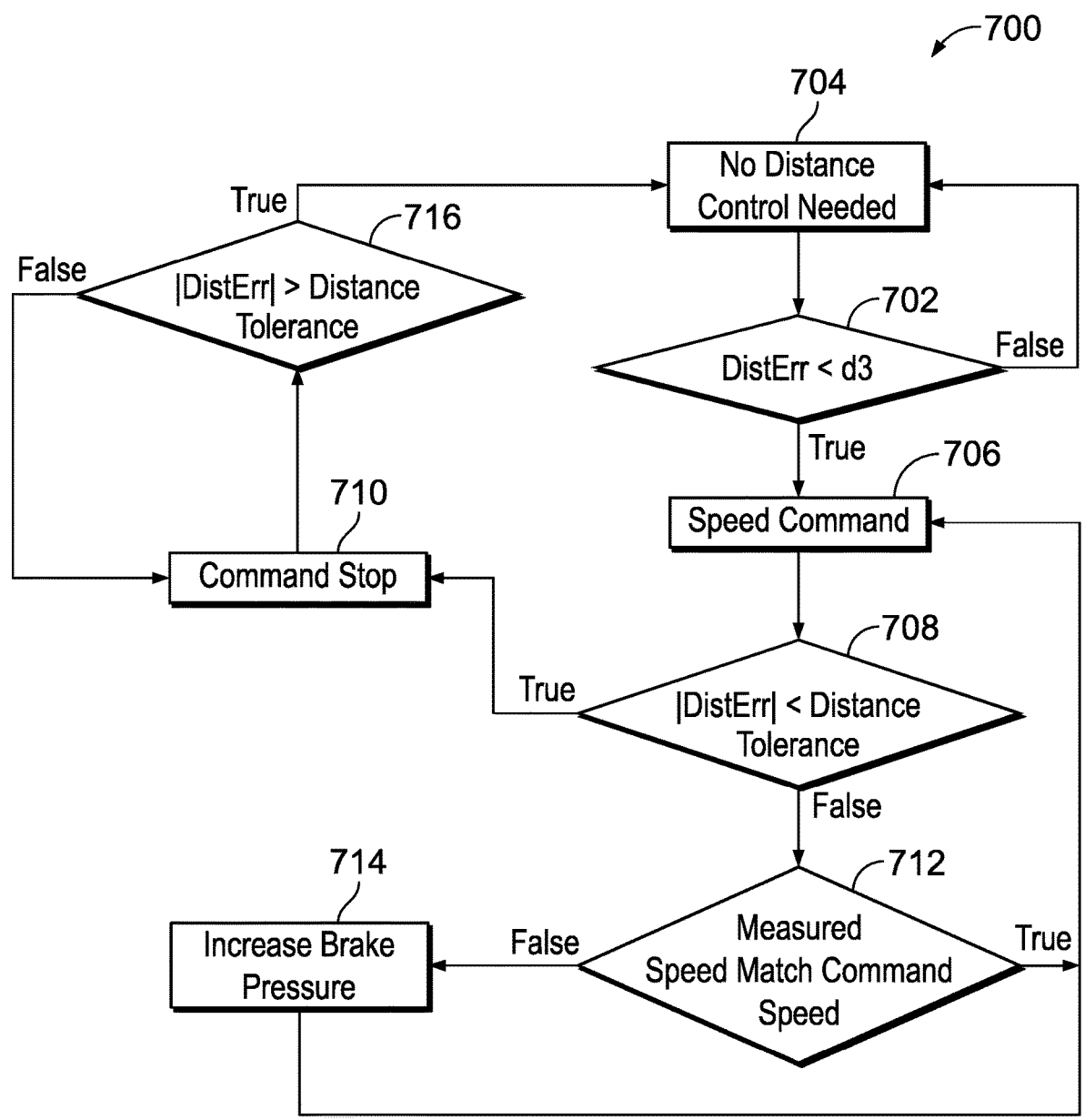
FIG. 7A illustrates a simplified flow diagram of an exemplary method for the automated distance control system controlling the vehicle and implement with decelerating in coming to a stop at or around a target location.

The deceleration limit can be continuously monitored with respect to at least the rate at which the vehicle 102/implement 100 is decelerating and the distance traveled, as well as remaining to be traveled before the vehicle 102/implement 100 comes to a stop. For example, FIG. 7A illustrates a simplified flow diagram of an exemplary method 700 for the automated distance control system 200 controlling the deceleration of the vehicle 102 and implement 100 in coming to a stop upon traveling a desired distance of a distance request, and thus stopping at or around an associated target location. The method 700 is described below in the context of being carried out by the illustrated exemplary automated distance control system 200 and the method 600 discussed above. However, it should be appreciated that the method 700 can likewise be carried out by any of the other described implementations, as well as variations thereof. Further, the method 700 corresponds to, or is otherwise associated with, performance of the blocks described below in the illustrative sequence of FIG. 7A. It should be appreciated, however, that the method 700 can be performed in one or more sequences different from the illustrative sequence. Additionally, while certain aspects to the method 700 may be described below with respect to the controller 202 of the vehicle 102, such features can additionally, or alternatively, be performed by other controllers of the system 200, including, but not limited to the controller 202' of the towed implement 100.

In the example shown in FIG. 7A, a distance request indicates the vehicle 102/implement 100 is to travel a desired distance that is identified as "d3" in FIG. 7A. At block 702, the controller 202, including, for example, the automation controller 240 or the drive strategy controller 242, can determine if the distance remaining to be traveled by the vehicle 102/implement 100 before reaching the desired distance and/or associated target location, as generally indicated in FIG. 7A as "DistErr" and also discussed above with respect to at least Equation (3), is less than the desired distance (d3). If a determination is made at block 702 that the distance remaining to be traveled is not less than the desired distance of the distance request, then the controller 202 can determine that distance control is, at least currently, not needed, as indicated by block 704. However, if the distance remaining to be traveled is determined at block 702 to be less than the desired distance, then at block 706, the controller 202, including, for example, the automation controller 240 and/or the drive strategy controller 242, can determine a speed of travel for the vehicle 102/implement 100. The determined speed of travel can be determined as a function of the current speed and acceleration of the vehicle 102/implement 100, the distance remaining to be traveled (e.g., "DistErr"), and/or targets or limits with respect to deceleration, acceleration, and/or jerk for the vehicle 102 and/or implement 100, among other considerations. The jerk can be a derivative of acceleration, and can correspond to the rate at which the acceleration of an object, such as, for example, the acceleration of the vehicle 102 and/or implement 100, changes with respect to time.

According to certain embodiments, the deceleration, acceleration, and/or jerk targets or limits can be default parameters that may be provided by the implement 100. Additionally, or alternatively, the deceleration, acceleration, and/or jerk targets or limits can be based on the type of agricultural operation being performed, or current circumstances involving the implement 100. For example, according to certain embodiments, the deceleration, acceleration, and/or jerk targets or limits for a grain cart when grain cart is full of grain product can be different than when the grain cart is relatively empty. Such differences can, for example, be attributed to attempting to minimize or prevent movement of grain product relative to the grain cart as the grain card is decelerating or brought to a stop. However, such targets and limits for deceleration, acceleration, and/or jerk can be set, or adjusted, by an operator, such as, for example, in accordance with an operator's preference. Additionally, such targets or limits can be based on other criteria, including for example, information regarding the terrain along which the vehicle 102/implement 100 is traveling, as may be automatically detected and/or inputted by an operator.

As the vehicle 102/implement 100 travels using the speed command generated at block 706, the controller 202 can continue to monitor the measured distance for the travel of the vehicle 102/implement 100. Further, as indicated by block 708, the controller 202 can determine whether the distance remaining to be traveled is less than the previously discussed distance tolerance. As indicated by FIG. 7A, the controller 202 can evaluate an absolute value for the remaining distance to be traveled relative to the distance tolerance. If the controller 202 determines that the remaining distance to be traveled satisfies, or is within, the distance tolerance, then at block 710 the controller 202 can issue a command to stop the vehicle 102/implement 100. As previously discussed, such a command can include, for example, the drive strategy controller 242 generating a signal or current for the brake actuator 232 and/or transmission actuator 228 that can be utilized in stopping the movement of the vehicle 102/implement 100.

Conversely, if at block 708 a determination is made by the controller 202 that the distance remaining to be traveled, or measured distance, is outside of the distance tolerance, the controller 202, including, for example, the automation controller 240 and/or drive strategy controller 242, can determine at block 712 whether the speed of travel of the vehicle 102/implement 100, as may be measured using information from the speed sensor 224, is in accordance with the speed command that was generated at block 706. If the controller 202 determines at block 712 that the speed of the vehicle 102 is in accordance with the speed command determined at block 706, the method 700 can return to block 706, where the speed command can, if necessary, be updated at least as the distance to travel, or measured distance, continues to change, including, for example, indicates a decrease in a difference between the measured distance and the desired distance of the distance request. For example, according to certain embodiments, at predetermined intervals, such as, for example, every 10 milliseconds, the controller 202 can calculate the distance remaining before the vehicle 102 is to stop.

If, however, at block 712, a determination is made by the controller 202 that the vehicle 102 is not traveling at a speed that satisfies the speed command that had been generated at block 706, then at block 714, the controller 202 can be utilized to adjust the speed of travel of the vehicle 102/implement 100. For example, as indicated in FIG. 7A, such an adjustment can include the controller 202 issuing a command to adjust the operation of the brake actuator 232 so as to increase brake pressure, and thereby decrease the speed of travel of the vehicle 102/implement 100. However, other adjustments can also be made, including, for example, changes with respect to the operation of the transmission actuator 228, and thus the transmission system 212.

Returning to block 710, following issuance of a command by the controller 202 to stop the movement of the vehicle 102/implement 100, and the vehicle 102/implement 100 coming to a stop, the controller 202 can determine at block 716 whether the difference between the measured distance and the desired distance of the distance request is greater than the distance tolerance. For example, although the stop command issued at block 710 was in response to determination at block 708 that the difference between the measured distance and desired distance is less than the distance tolerance, the determination at block 716 can be used to confirm that the vehicle 102/implement 100 stopped after a measured distance of travel that is within the distance tolerance of the desired distance. Thus, if the vehicle 102/implement 100 stopped at a measured distance that satisfies the desired distance, or is within the distance tolerance of the desired distance of the distance request, then the vehicle 102/implement 100 can remain at the stopped location, as generally indicated by block 710. However, if, when coming to a stop, the vehicle 102/implement 100 traveled a distance that placed the measured distance outside of the distance tolerance of the desired distance, then the method 700 can resume with the controller 202 issuing a command to again move the vehicle 102/implement 100 so as to correct, or adjust, the measured distance, and thus the position of the vehicle 102/implement so as to within the distance tolerance of the desired distance.

FIGS. 7B-7F illustrate different exemplary scenarios and parameters for using the methods 600, 700 discussed herein in bringing the vehicle 102 to a stop upon the measured distance satisfying the desired distance of a distance request, including being within the distance tolerance of the distance request. For purposes of explanation with regards to deceleration of the vehicle 102, FIGS. 7B, 7D, 7E, and 7F illustrate three time periods or zones for deceleration, namely: (1) a first zone starting at an initial time ($t_0$) to a first time ($t_1$) during which the vehicle 102 experiences constant negative jerk; (2) a second zone starting at the first time ($t_1$) to a second time ($t_2$) during which the vehicle 102 experiences constant deceleration; and, (3) a third zone starting at the second time ($t_2$) to a third time ($t_3$) during which the vehicle 102 experiences constant positive jerk. Also, as seen, the horizontal axis in FIGS. 7B-7F represents time (seconds).

Figure 7B:
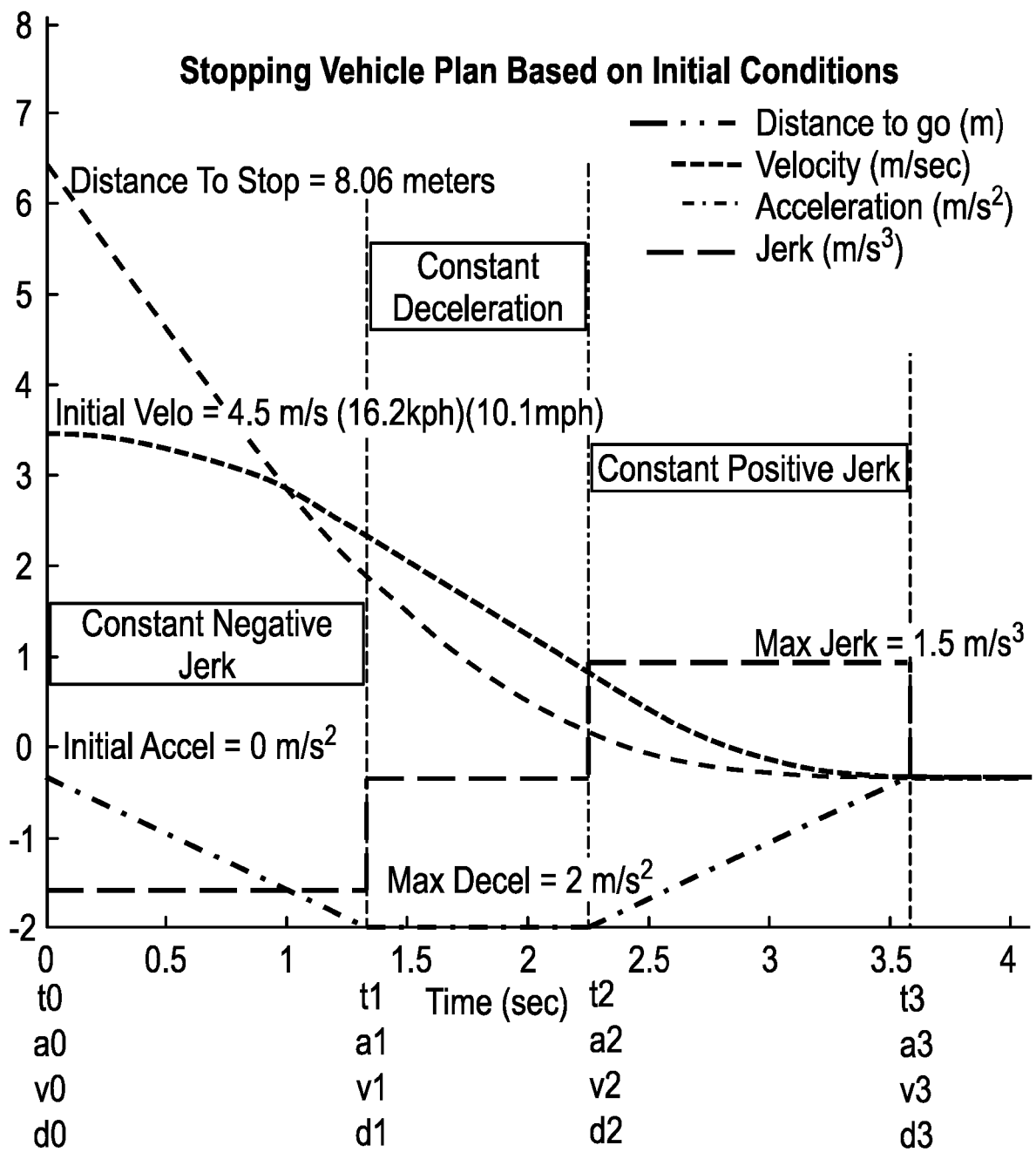
FIGS. 7B-7F illustrate different exemplary scenarios for using the methods discussed herein in bringing the vehicle and implement to a stop.

In the example shown in FIG. 7B, the maximum deceleration is set at 2 meters per second squared ($m/s^2$) and the maximum jerk is set at 1.5 meters per second cubed ($m/s^3$). Additionally, in the example in FIG. 7B, at the initial time ($t_0$), the distance until the vehicle 102 is to stop is 8.06 meters (m), and the vehicle 102 has an initial velocity of 4.5 meters per second (m/s) and an initial acceleration of 1.5 $m/s^2$. In the example shown in FIG. 7D, the maximum deceleration is set at 2 $m/s^2$ and the maximum jerk is set at 1.5 $m/s^3$, at the initial time ($t_0$), and the distance until the vehicle 102 is to stop is 12.21 m, and the vehicle 102 has an initial velocity of 4.5 m/s and an initial acceleration of 1 $m/s^2$. In the example shown in FIG. 7E, the maximum deceleration is set at 1.4 $m/s^2$ and the maximum jerk is set at 0.8 $m/s^3$, at the initial time ($t_0$), and the distance until the vehicle 102 is to stop is 11.17 m, and the vehicle 102 has an initial velocity of 4.5 m/s and an initial acceleration of 0 $m/s^2$. In the example shown in FIG. 7F, the maximum deceleration is set at 1.4 $m/s^2$ and the maximum jerk is set at 4 $m/s^3$, at the initial time ($t_0$), and the distance until the vehicle 102 is to stop is 8.02 m, and the vehicle 102 has an initial velocity of 4.5 m/s and an initial acceleration of 0 $m/s^2$.

Figure 7C:
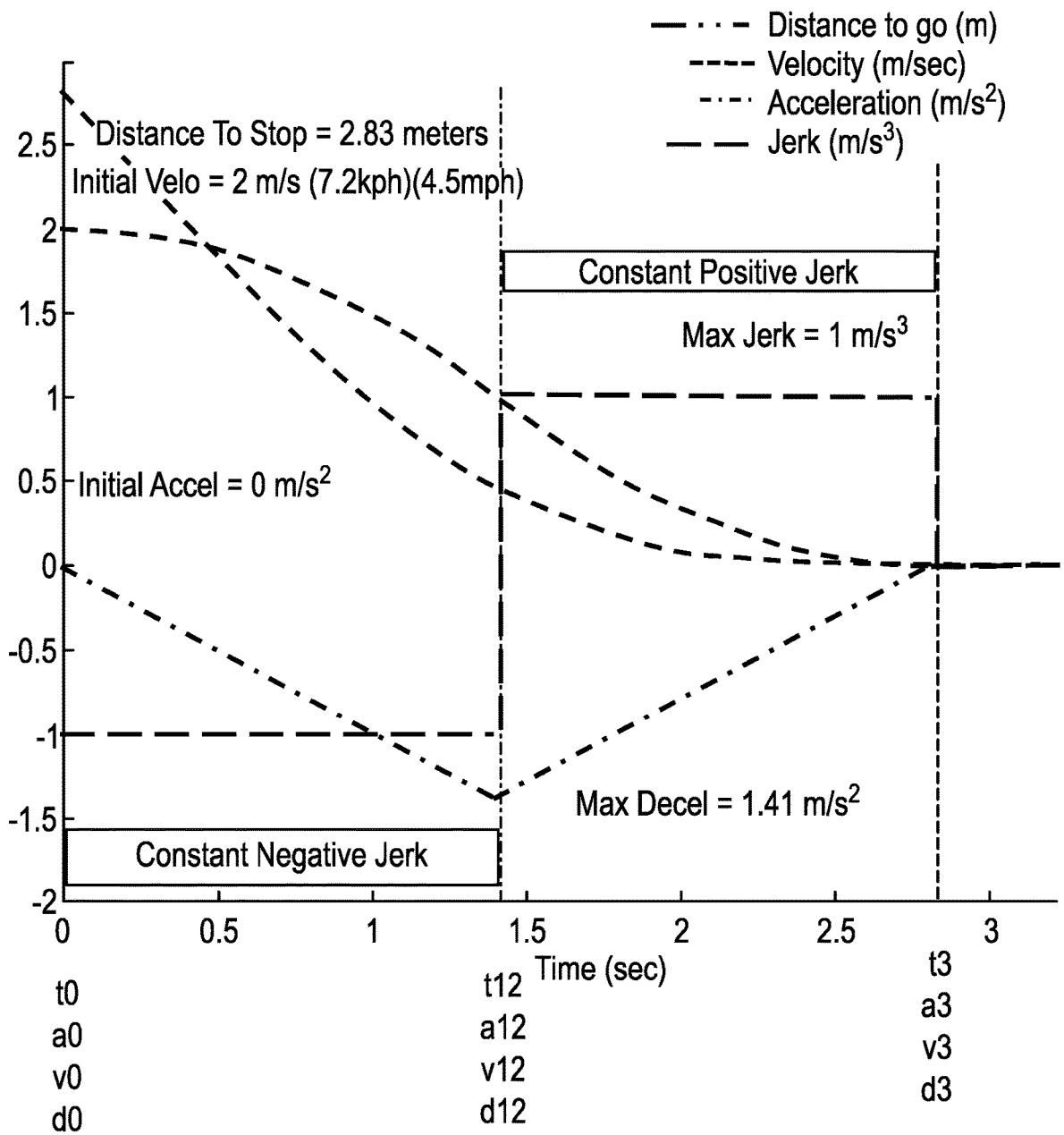
Figure 7D:
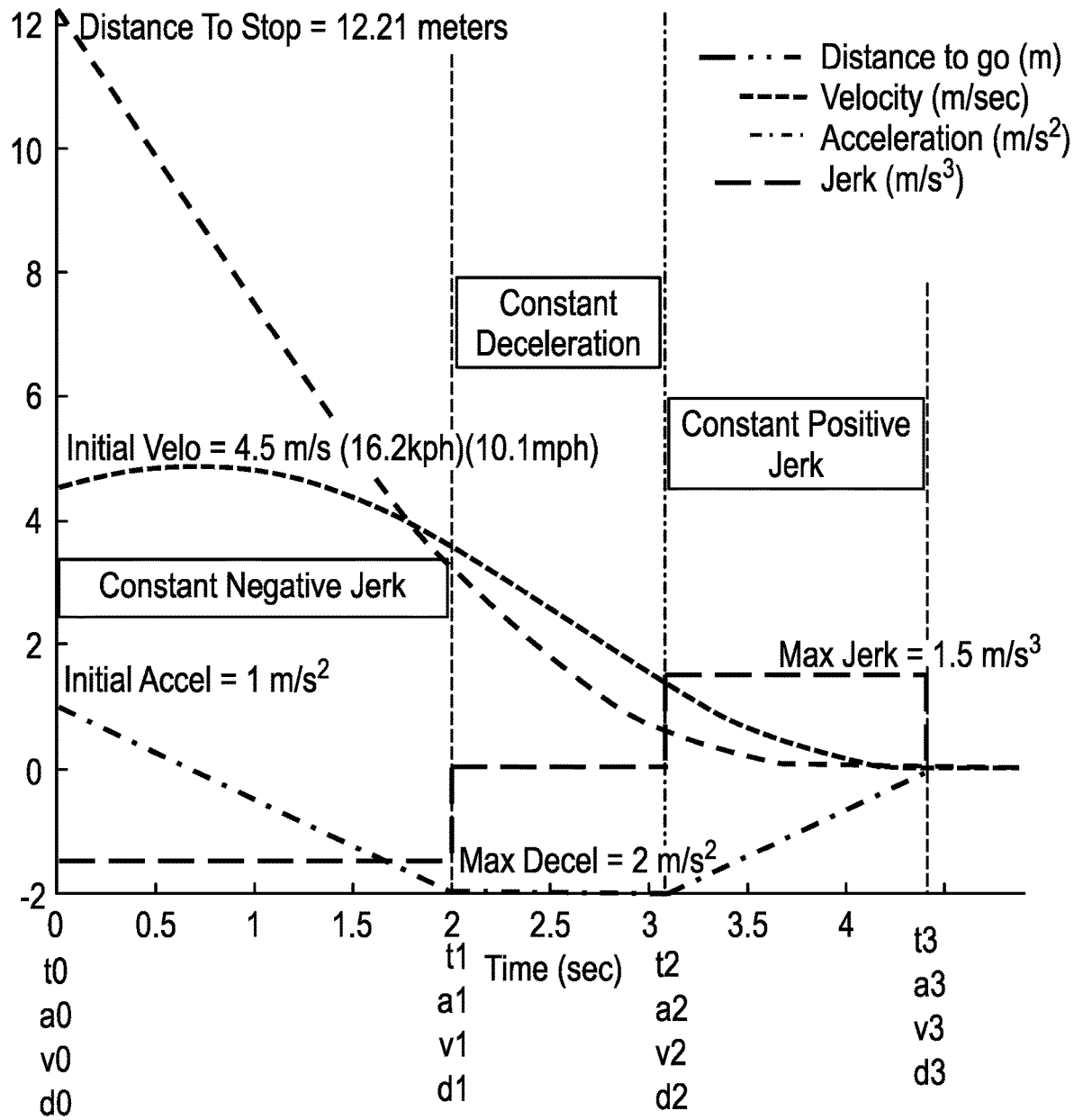
Figure 7E:
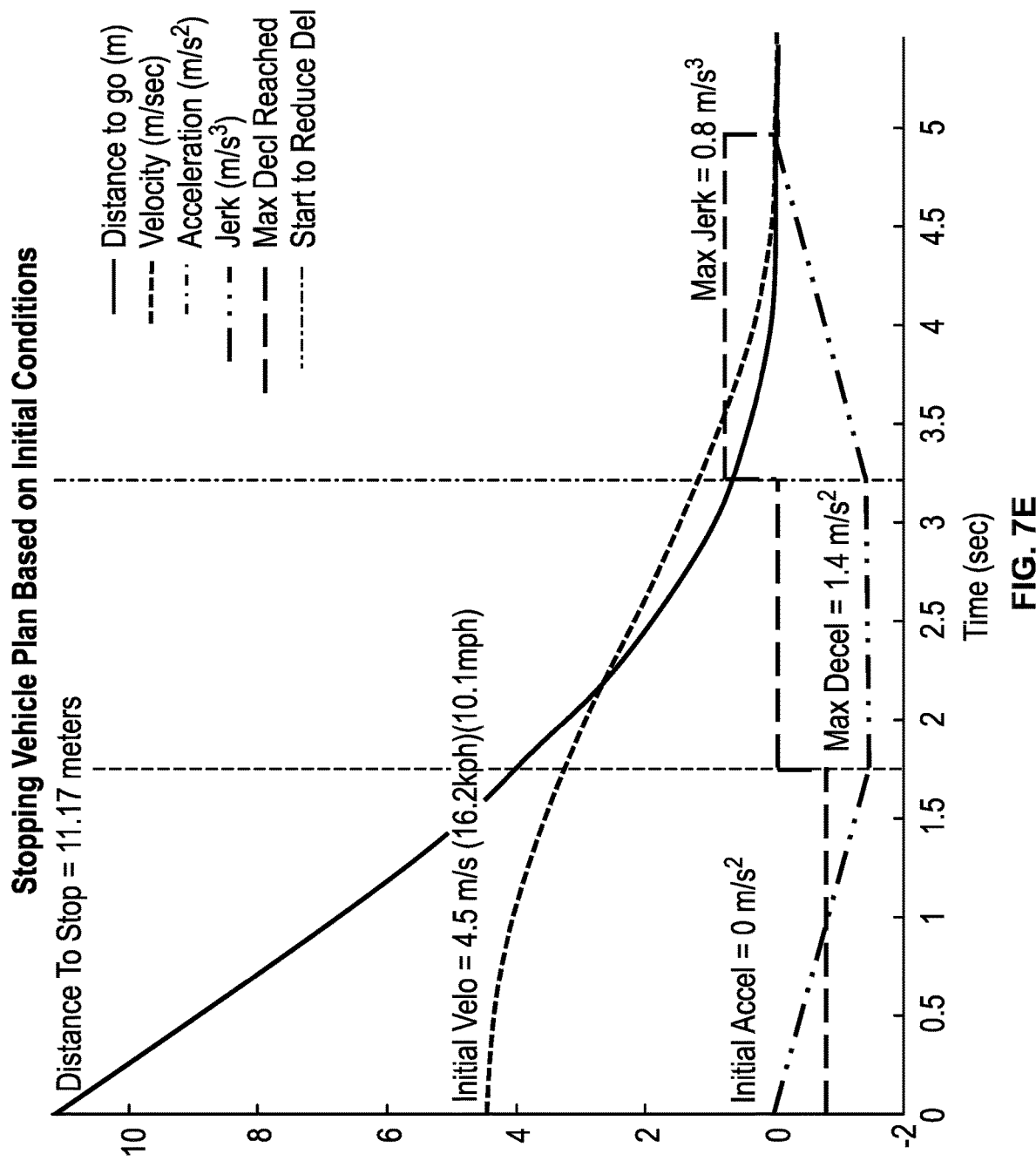
Figure 7F:
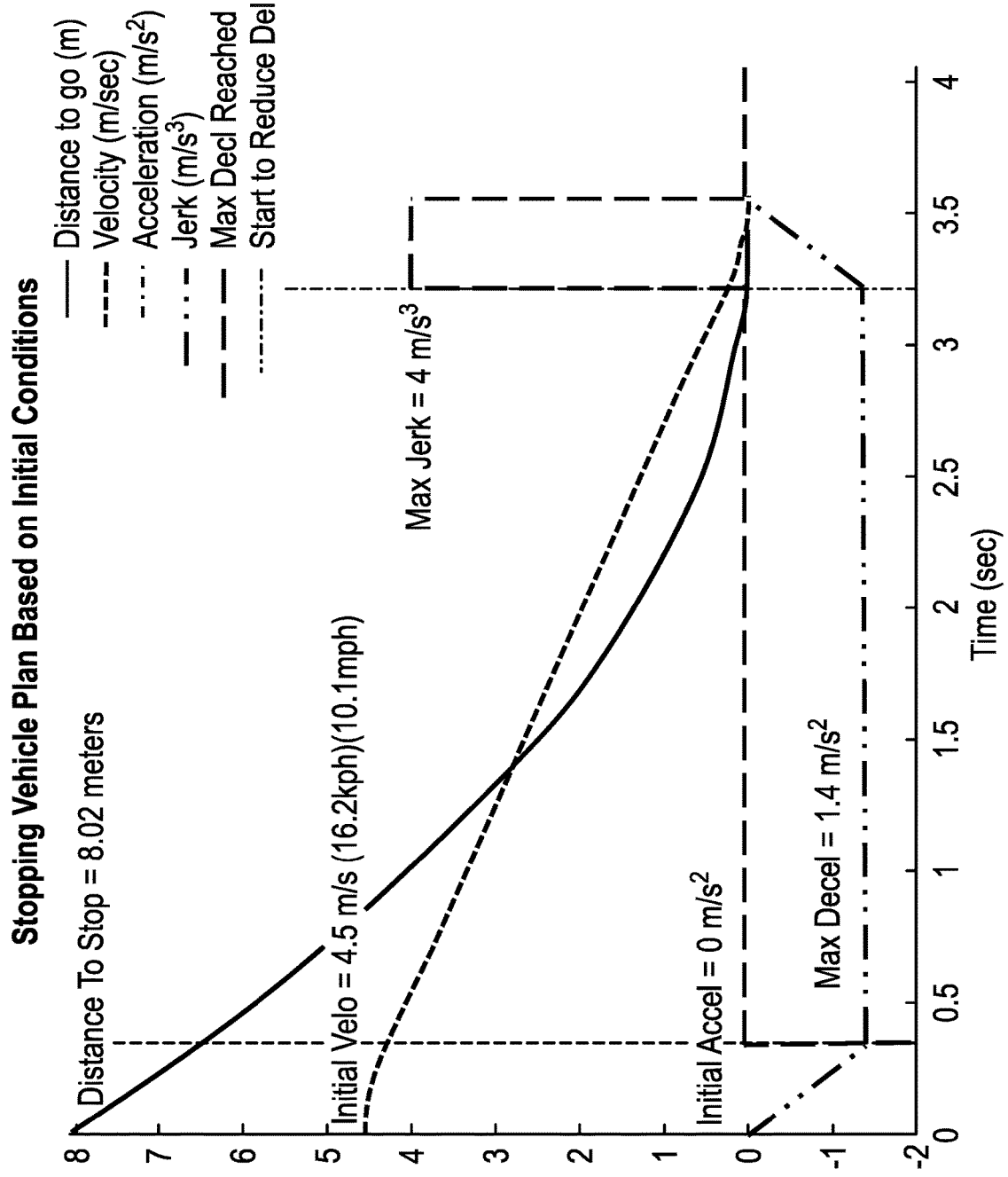

With respect to FIG. 7C, FIG. 7C illustrates a scenario in which the vehicle 102 is traveling at a speed that is sufficiently low or slow such that a deceleration target or limit will not be reached by the vehicle 102. Thus, in the example shown in FIG. 7C, there is no constant declaration, or second time zone illustrated. Instead, in the illustrated example, the first time zone ($t_0$–$t_1$) and second time zones ($t_1$–$t_2$) merge into a time from the initial time to the second time (e.g., $t_0$–$t_{12}$) of constant negative jerk, while the time between $t_{12}$ to the third time $t_3$ experiences constant positive jerk. In the example shown in FIG. 7C, the maximum deceleration is set at 1.41 $m/s^2$ and the maximum jerk is set at 1 $m/s^3$, and at the initial time ($t_0$), the distance until the vehicle 102 is to stop is 2.83 m, and the vehicle 102 has an initial velocity of 2 m/s and an initial acceleration of 0 $m/s^2$.

As indicated by FIGS. 7B-7F, as the maximum jerk decreases, the maximum acceleration increases, and the initial speed becomes smaller, the time of the constant deceleration zone (e.g., second zone) becomes smaller, and can even disappear. Further, having an initial value of acceleration be a non-zero value can impact both the time needed for the constant negative jerk zone (e.g., first zone) and the duration of time for the vehicle 102 to stop. As also seen, the jerk and deceleration limits or targets can impact the distanced needed to bring the vehicle 102 to a stop.

Figure 8:
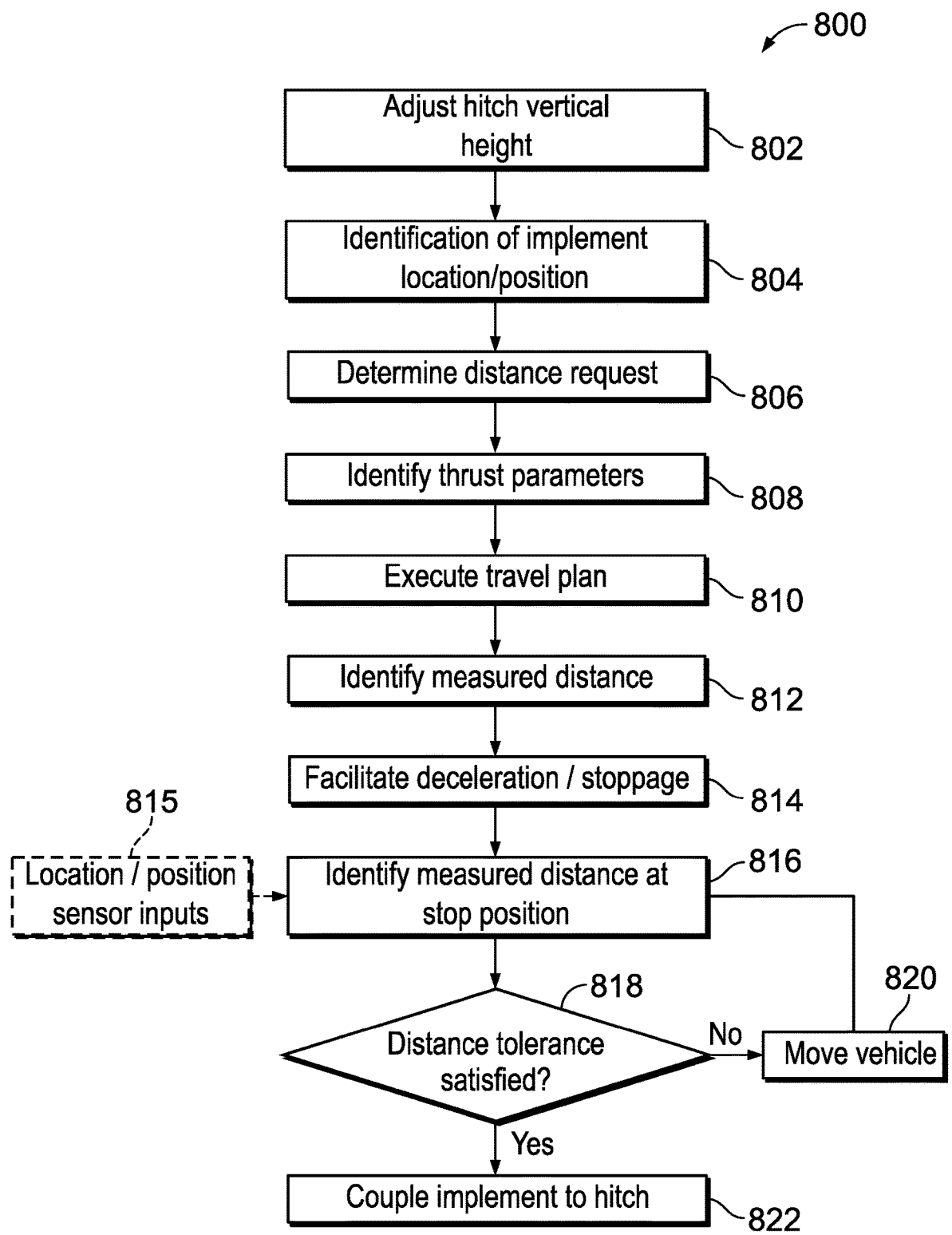
FIG. 8 illustrates a simplified flow diagram of an exemplary method for coupling an implement to a vehicle utilizing the illustrated automated distance control system.

FIG. 8 illustrates a simplified flow diagram of an exemplary method 800 for coupling an implement 100 to a vehicle 102 utilizing the illustrated automated distance control system 200. The method 800 is described below in the context of being carried out by the illustrated exemplary automated distance control system 200. However, it should be appreciated that the method 800 can likewise be carried out by any of the other described implementations, as well as variations thereof. Further, the method 600 corresponds to, or is otherwise associated with, performance of the blocks described below in the illustrative sequence of FIG. 8. It should be appreciated, however, that the method 800 can be performed in one or more sequences different from the illustrative sequence. Additionally, while certain aspects to the method 800 may be described below with respect to the controller 202 of the vehicle 102, such features can additionally, or alternatively, be performed by other controllers of the system 200, including, but not limited, to the controller 202' of the towed implement 100.

The vehicle 102 can be coupled to the implement 100 in a variety of different manners, including, for example, via use of a coupling device, such as, for example, the hitch 118 (FIG. 1). According to such embodiment, the coupling device can have a first hitch body 118a that is secured to the towing implement 100 and a second first hitch body 118a that is secured to the implement 100, the first hitch body 118a being selectively coupled to the second hitch body 118b, and/or vice versa. According to certain embodiments, at block 802 a vertical height of one or both of the first hitch body 118a and the second hitch body 118b can be adjusted such that the first hitch body 118a or second hitch body 118b is moved into a vertical position at which the first hitch body 118a engages the second hitch body 118b in a manner that couples, or at least assists in the coupling of, the first and second hitch bodies 118a, 118b. Such adjustment in the vertical height of the first hitch body 118a or second hitch body 118b can be attained in a variety of different manners, including, for example, automatically via operation of an electric, hydraulic, or pneumatic actuator, or via manual adjustment by an operator.

At block 804, the sensor system 208, 208' of either, or both, the vehicle 102 or implement 100 can identify the location of one or both of the vehicle 102 or the implement 100. For example, according to certain embodiments, an optical sensor 214 of the vehicle 102 can identify a location of the implement 100. Using such information captured by the optical sensor 214, the controller 202, including, but not limited to, the automation controller 240 or the drive strategy controller 242, can identify a target location at which the vehicle 102 will be positioned such that the first hitch body 118a is, at least in a horizontal direction, at a location to be coupled to, or engage, the second hitch body 118b. Thus, at block 804, a target location can be identified similar to that discussed above with respect to block 602 in FIG. 6A. Further, similar to at least block 604, using at least the information obtained at block 804, at block 806 a desired distance corresponding to the distance that the vehicle 102 is to travel to at least horizontally align, and/or engage, the first hitch body 118a with the second hitch body 118b can be determined. Additionally, similar to block 604, and block 806, parameters associated with the speed, acceleration, and/or deceleration for the vehicle 102 to travel the desired distance and/or to the target location can be determined by the controller 202, including, but not limited to, either one or both of the automation controller 240 or the drive strategy controller 242.

At block 808, maximum thrust or force parameters can be identified that can correspond to the maximum thrust/force at which the first hitch body 118a is to engage the second hitch body 118b. Such maximum thrust or force parameters can be based on a variety of different criteria including, for example, the type or model of coupling device as well as the type of vehicle 102 and/or implement 100

Similar to block 610 of FIG. 6A, using at least the information determined at blocks 806 and 808, a travel plan can be generated for the movement of the vehicle 102. Such a travel plan can include, for example, the Desired Distance Request and the Desired Tolerance Request, as discussed, for example, above with respect to at least FIGS. 5 and 6. Thus, the travel plan can be determined such that the vehicle 202 will travel the desired distance, which, again, can be determined by the controller 202, including, for example, the automation controller 240 or the drive strategy controller 242, and which can correspond to the distance the vehicle 102 is to travel to reach the target location for coupling the vehicle 102 to the implement 100.

The travel plan can then be executed at block 810. As previously discussed, such execution of the travel plan can include the drive strategy controller 242 providing signals, or current, to operate at least the brake actuator 232 and/or transmission actuator 228 in a manner that facilitates movement of the vehicle 102 in accordance with the travel plan. As with other embodiments, whether measured distance that will be monitored has, or has not, been reset to zero when execution of the travel plan is to commence can be based, at least in part, on the timing of activation, or key-on, of the vehicle 102. For example, if the vehicle 102 was activated and performing other operations prior, and not deactivated before proceeding with executing the travel plan at block 810, the measured distance may not be reset to zero for purposes of executing the travel plan at block 810. Conversely, if the was activated (keyed-on) specifically occurred in connection with executing the travel plan at block 810, then the measured distance may be reset to zero before proceeding with executing the travel plan at block 810.

As the vehicle 102 travels in accordance with the travel plan, the distance of travel can be measured at block 812 so as to attain the measured distance. Such measuring of the distance traveled to provide, and track, the measured distance, can be similar to that discussed above with respect to block 614 of FIG. 6A. Thus, according to embodiments in which the vehicle 102 moves in a rearward direction in connection with engaging the first hitch body 118a with the second hitch body 118b, the measured distance may be decreased in connection with such rearward travel. Conversely, if the vehicle 102 moves in a generally forward direction while traveling to the target location, the measured distance can increase.

Additionally, similar to block 624 of FIG. 6B, at block 814, as the vehicle 102 gets closer to the target location, the vehicle 102 can decelerate before eventually stopping at, or around, the desired distance and/or the target location at block 816. While the measured distance can provide an indication of whether the vehicle 102 is at, or around, the desired distance and/or the associated target location, additional information can be provided to further identify, or confirm, that the vehicle 102 has stopped at the desired distance and/or target location, or otherwise to identify the location at which the vehicle 102 has stopped. For example, as indicated by block 815, one or more sensors of the sensor system 208, including, for example, an optical sensor 214, can obtain or otherwise capture information that can be used by the controller 202, including, for example, the automation controller 240 or drive strategy controller 242, to identify the location at which the vehicle 102 has stopped.

Similar to block 628 of FIG. 6B, at block 818 a determination can be made as to whether the measured distance that the vehicle 102 traveled, or the location at which the vehicle 102 is at, relative to the desired distance the vehicle 102 was to travel, satisfies the predetermined distance tolerance. If the controller 202 determines at block 818 that the vehicle 102 is at a location that is outside the predetermined distance tolerance for the desired distance, then, similar to block 630 of FIG. 6B, at block 820 the controller 202 can issue one or more commands to operate the brake actuator 232 and/or transmission actuator 228, among other components of the vehicle 102, to move the vehicle 102 to a position results in a corresponding adjustment to the measured distance such that the measured distance is within the predetermined distance tolerance of the desired distance. Upon the measured distance being determined to be within the distance tolerance of the desired distance, the first hitch body 118a can be coupled to the second hitch body 118b at block 822.

While the foregoing includes discussion of controlling the distance of travel of the vehicle 102/implement 100 in connection with performing an agricultural operation relating to unloading a harvested material, such distance control can be used in connection with a variety of other tasks and operations. For example, the distance control systems 200 and methods discussed herein can be used in connection with performing three-point turns. In at least such circumstances, the controller 202, including, for example, the automation controller 240, can be used to determine how far the vehicle 102, and associated implement 100, if any, is to move. The drive strategy controller 242, or a controller specifically associated with transmission and/or brake control, can be tuned to interact with the specific type of transmission and/or brake hardware of the associated transmission system 212 and brake system 230, so as to achieve the desired distance.

Moreover, during three point-turns, the system 200 can be utilized to accurately control the distance the vehicle 102 moves, particularly in close quarters where the vehicle 102 could potentially contact a wall, fence, or travel into a ditch. For example, a first travel request can correspond to the vehicle 102 moving in a first direction in which the transmission system 212 is in a forward gear such that the vehicle 102 travels in a generally forward direction a measured distance that corresponds to a first desired distance to a first target location. As with other embodiments, the transmission system 212 and brake system 230, and, moreover, the brake actuator 232 and/or transmission actuator 228, can be operated in response to the distance request such that the vehicle 102/implement 100 is brought to a stop at a location at which the measured distance is within the distance tolerance of the first desired distance of the first distance request. The controller 202, including, for example, the automation controller 240 and/or drive strategy controller 242, can then generate a second distance request that facilities the transmission system 212 using a reverse gear of a transmission of the transmission system 212 such that the vehicle 102/implement 100 backs up or is reversed toward a second target location. Moreover, in response to the second distance request, the brake actuator 232 and/or transmission actuator 228 can be operated such that that in connection with traveling backwards to the second target location, the vehicle 102/implement 100 is brought to a stop at a location at which the measured distance is within the distance tolerance of the second desired distance of the second distance request. The controller 202 can then generate a third distance request that facilities the transmission system 212 using a forward gear such that the vehicle 102/implement 100 moves toward a third target location associated with a third distance request.

Additionally, while the foregoing discusses agricultural operations being performed via use of an implement 100 being pushed or towed by the vehicle 100, the agricultural operation can be performed by the vehicle 102 without the implement 100, or, alternatively, wherein the implement 100 is part of the vehicle 102. For example, according to certain embodiments, the vehicle 100 can be a loader that is configured to load, or otherwise place, a harvested material, including, for example, a bale of harvested material, onto a trailer and/or in connection the crowding a pile of harvested material onto the trailer. In such an example, the distance sensor 216 can be configured to provide information to the controller 202, including the automation controller 240 and/or drive strategy controller 242, indicating, or used to determine, the distance between the vehicle 102 and the trailer. Such distance information can indicate, or otherwise provide, a desired distance for a distance request that is used to move the vehicle 102 to a target location at which the vehicle 102 can, in this example, load the harvested material onto the trailer. Further, the controller 202 can also utilize such distance information to generate a maximum force command to the vehicle 102 that can control the amount of force the vehicle 102 can impart on at least the harvested material. Moreover, in the illustrated example, such a maximum force command can control the force from the movement of the vehicle that is used to push the harvested material onto the trailer. Such a maximum thrust force can be attained in a variety of manners, including in connection with parameters that can be associated with operating the transmission system 212, brake system 230, and/or other system of the vehicle 102, moreover, the brake actuator 232 and/or transmission actuator 228 to satisfy the distance request. For example, according to certain embodiments, satisfying the maximum thrust force in connection with also satisfying the distance request can include automatically controlling parameters such as, for example, a clutch pressure and/or motor torque, among other parameters.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for automatically controlling a distance of ground travel, the system comprising:
   a transmission actuator configured to adjust a transfer of power by a transmission system from a prime mover of the system;
   a brake actuator configured to control an operation of a brake system that adjusts a speed of travel of the system;
   at least one processor;
   a memory device coupled with the at least one processor, the memory device including instructions that when executed by the at least one processor cause the at least one processor to:
      generate a distance request comprising a desired distance the system is to travel to reach a target location;
      determine a distance tolerance;
      tally, as the system travels, a measured distance corresponding to a distance of measured travel by the system; and
      generate, automatically, one or more signals to adjust an operation of the brake actuator and the transmission actuator to facilitate a stop in a travel of the system at a target location at which a difference between the measured distance and the distance request satisfies the distance tolerance.

2. The system of claim 1, wherein the memory device further includes instructions that when executed by the at least one processor cause the at least one processor to:
   identify, using information obtained from a sensor of the system, the target location, and wherein the distance request is at least partially based on a distance of travel of the system from an initial position to the target location.

3. The system of claim 1, wherein the memory device further includes instructions that when executed by the at least one processor cause the at least one processor to:
   generate a distance tolerance request;
   evaluate whether at least one of the transmission system and the brake system can satisfy the distance tolerance request; and
   adjust, if the transmission system or the brake system cannot satisfy the distance tolerance request, the distance tolerance request to provide the distance tolerance.

4. The system of claim 1, wherein the memory device further includes instructions that when executed by the at least one processor cause the at least one processor to:
generate, automatically, and in response to the stop in the travel of the system at the target location to initiate a performance of an agricultural operation by the system.

5. The system of claim 4, wherein the memory device further includes instructions that when executed by the at least one processor cause the at least one processor to:
determine a second distance request for another travel of the system to a second target location;
tally the measured distance during the other travel to the second target location;
generate a plurality of commands for each of the brake actuator and the transmission actuator to facilitate a second stop of the system when a difference between the measured distance and the second distance request satisfies the distance tolerance; and
initiate a performance of a second agricultural operation following the second stop of the system.

6. The system of claim 1, wherein the memory device further includes instructions that when executed by the at least one processor cause the at least one processor to:
determine the measured distance at which, before reaching the desired distance of the distance request, a speed of travel of the system is to begin deceleration such that the stop in the travel of the system occurs at a location at which the difference between the measured distance and the distance request satisfies the distance tolerance.

7. The system of claim 1, wherein the memory device further includes instructions that when executed by the at least one processor cause the at least one processor to:
determine, after the stop of the system, if the difference between the measured distance and the distance request satisfies the distance tolerance; and
generate, if the difference between the measured distance after the stop of the system and the distance request does not satisfy the distance tolerance, an adjustment command for at least one of the brake actuator and the transmission actuator to facilitate a movement of the system to another location at which the difference between the measured distance and the distance request satisfies the distance tolerance.

8. The system of claim 1, wherein the measured distance resets in response to at least one of a key-on or key-off of the system.

9. The system of claim 1, wherein the system includes at least an agricultural vehicle, and wherein the tally of the measured distance comprises an increase in the measured distance in response to a travel by the system in a first direction, and a decrease in the measured distance in response to the travel by the system being in a second direction.

10. The system of claim 9, wherein the system includes at least an implement that is to be coupled to the agricultural vehicle, and wherein the desired distance of the distance request is a distance the agricultural vehicle is to travel to engage the implement, the memory device further including instructions that when executed by the at least one processor cause the at least one processor to:
identify a maximum thrust force at which the agricultural vehicle is to engage the implement; and
determine, relative to the measured distance and before satisfying the distance request, when the agricultural vehicle is to begin a deceleration in a speed of travel such that the maximum thrust force is not exceeded when the agricultural vehicle engages the implement.

11. The system of claim 1, wherein the memory device further includes instructions that when executed by the at least one processor cause the at least one processor to issue a command to at least one of the brake actuator and the transmission actuator to facilitate an adjustment in a travel speed of the system based on an outcome of a comparison of the measured distance and the distance request.

12. A method for automatically controlling a distance of ground travel by a system, the method comprising:
determining a distance request corresponding to a desired distance the system is to travel from an initial position to a target location;
determining a distance tolerance for the distance request;
measuring, as the system travels, a measured distance traveled by the system;
comparing, as the system travels, the measured distance with the distance request;
generating, in response to an outcome of comparing the measured distance with the distance request, one or more commands for a brake actuator and a transmission actuator of the system;
determining the measured distance at which, before satisfying the distance request, a speed of travel of the system is to begin a deceleration; and
generating, in response to a difference between the measured distance and the distance request satisfying the distance tolerance, a command for at least one of the brake actuator and the transmission actuator that facilitates a stop in the travel of the system.

13. The method of claim 12, wherein the method further comprises identifying, using information obtained from a sensor of the system, the target location.

14. The method of claim 13, wherein the sensor comprises an optical sensor, and wherein the information obtained from the sensor is information captured by at least one of an image of a video by the optical sensor.

15. The method of claim 12, wherein the method further comprises initiating a performance of a first agricultural operation following the stop in travel of the system, and wherein measuring the measured distance comprises increasing the measured distance in response to the system traveling in a first direction of travel, and decreasing the measured distance in response to the system traveling in a second direction of travel.

16. The method of claim 15, wherein the method further comprises:
generating a second distance request for another desired distance the system is to travel relative to the initial position and to a second target location;
tallying, as the system travels in accordance with the second distance request, and after performance of the first agricultural operation, the measured distance;
generating a plurality of commands for each of the brake actuator and the transmission actuator in accordance with at least the second distance request, wherein the plurality of commands includes at least one command that facilitates a second stop in travel of the system when a difference between the measured distance and the second distance request satisfies the distance tolerance; and
initiating a performance of a second agricultural operation following the second stop of the system.

17. The method of claim 12, wherein the method further comprises:
determining, following the stop of the system, if the difference between the measured distance and the distance request satisfies the distance tolerance; and generating, if the difference between the measured distance and the distance request does not satisfy the distance tolerance, an adjustment command for at least one of the brake actuator and the transmission actuator to facilitate a movement of the system to another location at which the difference between the measured distance and the distance request satisfies the distance tolerance.

18. The method of claim 12, wherein the method further comprises resetting the measured distance in response to at least one of a key-on or key-off of the system.

19. The method of claim 12, wherein the system includes at least an implement that is to be coupled to an agricultural vehicle, and wherein the desired distance of the distance request is a distance the agricultural vehicle is to travel to engage the implement, the method further comprising:
   identifying a maximum thrust force at which the agricultural vehicle is to engage the implement; and
   determining, relative to the measured distance and before satisfying the distance request, when the agricultural vehicle is to begin a deceleration in a speed of travel such that the maximum thrust force is not exceeded when the agricultural vehicle engages the implement.

20. The method of claim 19, wherein the method further comprises issuing a command to control at least one of a clutch pressure and a motor torque at a location, relative to the measured distance, before the difference between the measured distance and the distance request satisfying the distance tolerance.

* * * * *